US011813816B2

(12) United States Patent
Andrews et al.

(10) Patent No.: US 11,813,816 B2
(45) Date of Patent: Nov. 14, 2023

(54) MANUFACTURING PROCESS FOR MOLDED FOOTWEAR

(71) Applicant: WAYVE, INC., Carlsbad, CA (US)

(72) Inventors: Samuel S. Andrews, Knoxville, TN (US); Alexandra B. Joelson, Carlsbad, CA (US); Jack A. Browers, Sammamish, WA (US); Shahwaz Khan, Los Angeles, CA (US)

(73) Assignee: Wayve, Inc., Carlsbad, CA (US)

( * ) Notice: Subject to any disclaimer, the term of this patent is extended or adjusted under 35 U.S.C. 154(b) by 0 days.

(21) Appl. No.: 17/230,647

(22) Filed: Apr. 14, 2021

(65) Prior Publication Data

US 2022/0332072 A1 Oct. 20, 2022

(51) Int. Cl.
*B29D 35/08* (2010.01)
*A43B 13/40* (2006.01)
(Continued)

(52) U.S. Cl.
CPC .......... *B29D 35/081* (2013.01); *A43B 13/125* (2013.01); *A43B 13/386* (2013.01); *A43B 13/40* (2013.01)

(58) Field of Classification Search
CPC ..... A43B 13/125; A43B 13/386; A43B 13/40; A43B 13/127; A43B 13/38; A43B 13/42; B29D 35/081; B29D 35/10
See application file for complete search history.

(56) References Cited

U.S. PATENT DOCUMENTS

| 3,101,496 A | 8/1963 | Bingham, Jr. |
| 3,204,347 A | 9/1965 | Roberts |

(Continued)

FOREIGN PATENT DOCUMENTS

| DE | 1865431 | 1/1963 |
| DE | 3821602 | 3/1989 |

(Continued)

OTHER PUBLICATIONS

PCT; International Search Report and Written Opinion of the International Searching Authority for International Application No. PCT/US22/23541 dated Jul. 1, 2022.

(Continued)

*Primary Examiner* — Khoa D Huynh
*Assistant Examiner* — Haley A Smith
(74) *Attorney, Agent, or Firm* — Fitch, Even, Tabin & Flannery LLP

(57) ABSTRACT

The present disclosure describes molded footwear including a sole integrally connected to an upper. For example, a sole structure may include an insole and a strobel board. The insole may include a spacing structure that rests on a top surface of the strobel board to form a cavity between the insole and the strobel board. Further, the upper and/or strobel board may include perforations at least partially aligned with the cavity. Accordingly, the sole structure may be connected to the upper via injection molding material into the cavity formed between the insole, the strobel board, and the upper. The molding material may flow through the specifically located perforations in the shoe's upper and/or the shoe's strobel board such that the material bonds internally within the cavity, internally within the perforations, and externally to the shoe's upper and strobel board but within the mold cavity.

18 Claims, 39 Drawing Sheets

(51) Int. Cl.
*A43B 13/38* (2006.01)
*A43B 13/12* (2006.01)

(56) References Cited

U.S. PATENT DOCUMENTS

| | | | |
|---|---|---|---|
| 3,504,079 A | 3/1970 | Hall | |
| 3,731,406 A | 5/1973 | Young | |
| 3,982,336 A | 9/1976 | Herro | |
| 4,034,431 A | 7/1977 | Fukuoka | |
| 4,120,104 A * | 10/1978 | Lasmo | B29D 35/062 36/14 |
| 4,150,455 A | 4/1979 | Fukuoka | |
| 4,267,650 A | 5/1981 | Bauer | |
| 4,651,444 A * | 3/1987 | Ours | B29D 35/061 12/142 T |
| 4,899,465 A * | 2/1990 | Bleimhofer | A43B 1/0072 36/12 |
| 5,199,192 A | 4/1993 | Kilgore | |
| 5,317,822 A | 6/1994 | Johnson | |
| 5,628,127 A | 5/1997 | Guenter | |
| 5,644,857 A | 7/1997 | Ouellette | |
| 6,108,944 A | 8/2000 | Savoie | |
| 6,763,609 B2 | 7/2004 | Su | |
| 7,043,856 B2 | 5/2006 | Chen | |
| 7,171,768 B2 | 2/2007 | Klein | |
| 7,624,515 B2 | 12/2009 | Kita | |
| 7,743,530 B2 * | 6/2010 | Truelsen | A43D 3/026 36/27 |
| 8,544,189 B2 | 10/2013 | Chaney | |
| 9,737,109 B2 | 8/2017 | Johnson | |
| 2003/0041474 A1 | 3/2003 | Keidel | |
| 2003/0136024 A1 | 7/2003 | Su | |
| 2004/0088883 A1 | 5/2004 | Workman | |
| 2005/0198868 A1 | 9/2005 | Scholz | |
| 2007/0296115 A1 * | 12/2007 | Truelsen | A43D 3/026 36/83 |
| 2008/0196274 A1 | 8/2008 | Gerber | |
| 2014/0075787 A1 | 3/2014 | Cartagena | |
| 2014/0366402 A1 | 12/2014 | Cavaliere | |
| 2015/0305447 A1 | 10/2015 | Cavaliere | |
| 2021/0298411 A1 * | 9/2021 | Jensen | A43D 25/18 |

FOREIGN PATENT DOCUMENTS

| | | |
|---|---|---|
| DE | 19503405 | 4/1996 |
| DE | 102017212045 | 1/2019 |
| EP | 0115663 | 8/1984 |
| EP | 0830072 | 3/1998 |
| EP | 0900531 | 3/1999 |
| EP | 1430803 | 6/2004 |
| EP | 1612035 | 1/2006 |
| IT | 20030043 | 9/2004 |
| JP | 61179104 | 8/1986 |
| WO | 2020035539 | 2/2020 |

OTHER PUBLICATIONS

Oleer; "Shoe Lasting—Shoe Manufacture"; https://www.oleer.com/shoe-lasting/; downloaded Mar. 9, 2021; 2 pages.

The Sneaker Factory; "Shoe Construction Techniques"; https://www.sneakerfactory.net/2015/12/shoe-construction/; Dec. 28, 2015 (downloaded Mar. 9, 2021); 14 pages.

The Sneaker Factory; "Shoe Lasting Constructions"; https://www.sneakerfactory.net/2019/10/shoe-lasting/; Oct. 22, 2019 (downloaded Mar. 9, 2021); 13 pages.

* cited by examiner

MANUFACTURING PROCESS FOR MOLDED FOOTWEAR

BACKGROUND OF THE INVENTION

1. Field of the Invention

The present invention relates generally to footwear apparel, and more specifically to molded footwear.

2. Discussion of the Related Art

Various systems and processes are known in the art for molded footwear.

Generally, footwear apparel (e.g., such as shoes, sandals, boots, slippers, etc.) may be intended to comfort and protect a foot. In some cases, footwear apparel may also be worn by a user as an item of fashion or decoration. Footwear apparel may vary widely in style, complexity, and cost, as footwear apparel may be designed for different use cases and may include a variety of design elements, such as heels, laces, patterns, etc. Further, footwear apparel may be made of various materials including knit material, leather material, synthetic materials, wood, etc.

Articles of footwear (e.g., shoes) may include primary elements such as an upper (e.g., for securing the footwear to a user's foot and/or ankle) and a sole structure (e.g., for providing support for the user's foot, for protecting the user's foot from underlying terrain, etc.). An upper may be made from materials such as knit material, textile materials, polymers, etc. The upper may be stitched or bonded together to form a shell for securely receiving a user's foot. The sole structure may then be attached to a lower portion of the upper (e.g., positioned between the ground and the user's foot, within the stitched together upper). Techniques for securely attaching a sole structure to an upper may be desired.

SUMMARY

The present disclosure describes molded footwear including a sole integrally connected to an upper. For example, a sole structure may include an insole and a strobel board. The insole may include a spacing structure (e.g., supports) that rests on a top surface of the strobel board to form a cavity between the insole and the strobel board. Further, the upper and/or strobel board may include perforations at least partially aligned with the cavity. Accordingly, the sole structure may be connected to the upper via injection molding material (e.g., sole material) into the cavity formed between the insole, the strobel board, and the upper (e.g., the cavity between the bottom of the insole, the top of the strobel board, and the sides of the upper). The molding material may flow through the specifically located perforations in the shoe's upper and/or the shoe's strobel board such that the material bonds internally within the cavity, internally within the perforations, and externally to the shoe's upper and strobel board but within the mold cavity. Accordingly, a sole may be formed that integrally locks the sole structure to the upper.

A method, apparatus, and system for molded footwear are described. One or more embodiments of the method, apparatus, and system include providing a shoe upper, placing the shoe upper into a mold, and inserting an insole into the shoe upper to form a cavity between the insole and the shoe upper via a spacing structure that maintains the insole in a spaced apart relationship from the shoe upper. One or more embodiments of the method, apparatus, and system further include forming a bond within the cavity formed between the insole and the shoe upper by flowing material into a hole in the shoe upper positioned adjacent to the cavity, molding, externally to the shoe upper, an external portion of contiguous material bonded through the hole to the shoe upper, and removing the molded footwear from the mold.

An apparatus, system, and method for molded footwear are described. One or more embodiments of the apparatus, system, and method include a shoe upper comprising an interior and an exterior, wherein the interior defines a space having a bottom and sides surrounding the bottom, and a lower region of the sides comprises a hole. One or more embodiments of the apparatus, system, and method further include an insole comprising an upper surface and a lower surface, a spacing structure adjacent to the lower surface, wherein the insole is adjacent to and generally parallel with the bottom of the shoe upper, whereby the spacing structure maintains the insole in a spaced-apart relationship from the bottom, and to define a cavity between the insole, the bottom, and the lower region of the sides. One or more embodiments of the apparatus, system, and method further include a molded material substantially filling the cavity, and covering a portion of the exterior adjacent to the lower region of the sides, wherein the molded material is contiguous through the hole.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Footwear apparel (e.g., such as shoes, sandals, boots, slippers, etc.) may be worn by a user for comfort, foot protection, fashion or decoration, etc. In some cases, articles of footwear (e.g., shoes) may include elements such as an upper (e.g., for securing the footwear to a user's foot and/or ankle) and a sole structure (e.g., for providing support for the user's foot, for protecting the user's foot from underlying terrain, etc.).

An upper may be formed (e.g., stitched together) to surround some or all of a user's (e.g., a wearer's) foot. The upper may typically be made from any suitable material (e.g., such as TPU/PU/PVC-based synthetic leather material, leather material, knit material, textile material, etc.). In some examples, the upper may include a multitude of perforations, which are a form of through hole where the hole passes entirely through the upper material, that may be used to connect or house other elements of the shoe (e.g., such as a sole structure). For instance, a sole structure (e.g., a sole insert, a strobel board, etc.) may be assembled and may be attached to a lower portion of the upper via perforations that may take the shape of slots, circles, hexagons, or any other suitable shape.

According to techniques described herein, an upper and a strobel board may each include perforations according to designs enabling formation of a sole structure that is integrally connected to (e.g., locked to) the upper. For example, a sole structure may include an insole and a strobel board. An insole may include a spacing structure to provide a cavity between a top surface of the insole and a top surface of a strobel board. The cavity may be filled with sole material by injection molding material into a mold cavity. The molding material may flow through the specifically located perforations in the shoe's upper and strobel board such that the material bonds internally within the cavity, internally within the perforations, and externally to the shoe's upper and strobel board but within the mold cavity. Accordingly, a sole may be formed that integrally locks the sole structure to the upper.

Figure 1:
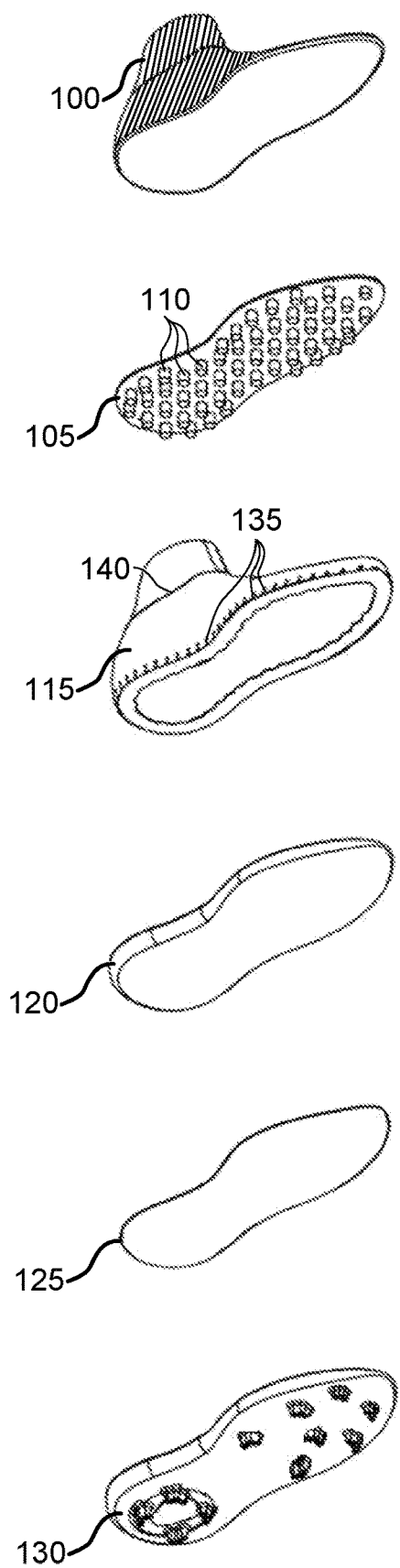
FIG. 1 shows an example of an exploded view of a shoe according to aspects of the present disclosure.

FIG. 1 shows an example of an exploded view of a shoe according to aspects of the present disclosure. The example shown includes last 100, insole 105, upper material 115, molded material 120, strobel board 125, outsole 130, side perforations 135, and collar 140.

In some examples, a sole assembly may include at least insole 105 and strobel board 125. A shoe may be manufactured or assembled such that the insole 105 and strobel board 125 are connected to the upper material 115. The upper material 115 may surround and support a user's foot and/or ankle. The insole 105 and strobel board 125 may provide support for the user's foot, protect the user's foot from underlying terrain, etc.

For instance, a last 100 may include a foot form that may be used to set the shape of a shoe. In some cases, a last 100 may be made of wood, plastic, or metal. In some examples described herein, a last 100 may be inserted into upper material 115 (e.g., or upper material 115 may be formed around the last 100). The last 100, insole 105, and strobel board 125 may be in a stacked formation within the upper material 115 for footwear (e.g., a shoe) manufacturing processes.

As described herein, the insole 105 may include spacing structure 110. Spacing structure 110 may include supports or protrusions from the bottom of the insole 105. Accordingly, the spacing structure 110 may provide a cavity between the insole 105 and the strobel board 125 when the sole structure (e.g., the insole 105 and the strobel board 125) is inserted into the upper material 115 (e.g., where the upper material 115 surrounding the sole structure acts as surrounding walls of the cavity between the insole 105 and the strobel board 125).

In one variation, the insole may be omitted, in which case the cavity is provided between the last 100 and the strobel board 125 when the sole structure (e.g., the strobel board 125) is inserted into the upper material 115 (e.g., where the upper material 115 surrounding the sole structure acts as surrounding walls of the cavity between the last 100 and the strobel board 125). In accordance with the present variation, the spacing structures 110 may be on the bottom of the last 100 (and sized and/or angled to facilitate removal of the last 100 from the upper material 115 after the molded material 120 is flowed into the cavity and hardens or sets. Instead of or in addition to the spacing structures 110, a porous material spacing feature can be employed (see for example the porous material spacing feature 2920 described hereinbelow in reference to FIG. 29).

Further, the upper material 115 may include side perforations 135 (e.g., where the side perforations 135 may be at least partially aligned with the mold cavity formed between the insole 105, the strobel board 125, and the upper material 115). As such, in accordance with one or more aspects of the techniques described herein, molding material 120 may be injected into the mold cavity through the side perforations 135. The molding material 120 may bond internally within the cavity, internally within the perforations, and externally to the shoe upper and strobel board but within the mold cavity, thus forming a sole which is integrally locked to the upper. In some examples, the cavity may be referred to herein as an internal cavity (e.g., as described in more detail herein, for example, with reference to FIGS. 12-18, 27, 28, and 31-34).

The present disclosure provides the presence of a complete or partial cavity (e.g., an internal cavity) within the shoe upper, which is housed between the upper material 115, the strobel board 125, and the insole 105 (e.g., wherein the insole 105 is formed in such a way that injection molded material may enter into it from any direction and be connected to and joined directly with any material entering the internal cavity from another direction before the molded material hardens or sets. In some examples, the molded material may be polyurethane and variants thereof, thermoplastic polyurethane and variants thereof, Ethylene-vinyl acetate and variants thereof, rubber and variants thereof, Polyvinyl Chloride and variants thereof, Acrylonitrile Butadiene Styrene and variants thereof, bio based materials such as materials made from sugarcane, corn, or bacterial cultures and variants thereof, or any other moldable materials than can be flowed into the cavity, rejoined, hardened and set, as described herein. In some examples, the internal cavity can be created through the use of an insole 105 described herein, where the insole 105 utilizes supports (e.g., spacing structure 110) that rest against the top side of the strobel board 125 to create an internal cavity between the insole 105 and the strobel board 125. Additionally, or alternatively, the internal cavity can be created by the use of an insert which utilizes a highly porous or absorbent material to form a pseudo-cavity which allows the injection molded material to readily flow into and through the internal cavity until the molded material hardens or sets.

The present disclosure describes various perforations that may be implemented for injection molding sole material into an internal cavity between an insole 105 and a strobel board 125 (e.g., where the cavity is formed based at least in part on spacing structure 110 of the insole 105). According to various examples described herein, perforations that may be implemented include perimeter upper perforations (e.g., side perforations 135 of upper material 115), underfoot upper perforations (e.g., perforations on an under side of upper material 115), strobel board perforations (e.g., perforations on strobel board 125), etc.

Side perforations 135 (e.g., perimeter upper perforations) may refer to perforations in the upper material 115 along the side of the upper material 115 and above the edge of the strobel board 125. Underfoot upper perforations may refer to perforations in the upper material 115 in a portion of the upper material 115 which overlaps with the strobel board 125 underneath the strobel board 125 which face the internal cavity (e.g., the internal cavity formed between the insole 115 and the strobel board 125). In some examples, underfoot upper perforations may directly align or partly align with perforations in the strobel board 125. Strobel board perforations may refer to perforations in the strobel board 125 which face the internal cavity. Any of such perforations may be of any shape. As an example, a perforation hole may have a diameter between 0.01 millimeters and 250 millimeters.

Accordingly, molded material 120 that is injected within the internal cavity (e.g., which has entered the cavity through perforations in the upper material 115 and/or perforations in the strobel board 125) may be joined or bonded together before or as the molded material hardens or sets.

In some examples, material may be injected through the perforations in the upper material 115 along the side of the upper material 115 and above the edge of the strobel board 125. As the material fills the internal cavity, the material may join/bond with the material (e.g., other of the same material) entering the cavity through other perforations.

In some examples, material may be injected through perforations in the strobel board 125 (e.g., strobel board perforations which face the internal cavity) and the filling of the internal cavity with this material may join/bond with the material entering the cavity through other perforations.

In some examples, material may be injected through the perforations in the upper material 115 in a portion of the upper material 115 which overlaps with the strobel board 125 (e.g., underneath the strobel board 125), where perforations in the upper material 115 face the internal cavity and may directly align or partly align with perforations in the strobel board. The internal cavity may be filled with the material as it joins/bonds with any material entering the cavity through other perforations.

In some examples, the material which fills the internal cavity through the perforations is the same material as that which forms the outsole 130. In some cases, the portion of the material which forms the outsole 130 may directly connect to all other portions of the outsole external to the shoe upper. Outsoles 130 that are formed this way may or may not be followed or precluded by additional shots of injection molded material which are thus bonded to the outsole material. In some cases, the outsole 130 which is formed in this way (e.g., and/or with any additional shots of injection molded material which are bonded to it as or after the molded material hardens or sets) may or may not envelope, connect to, or bond to non-injection molded materials or structures. In some examples, the outsole 130 may form an outsole with cleat studs of any style of cleat, may form an outsole with traction elements, etc.

The present disclosure further describes a lasting process in which two lasts 100 of different size are used to complete the upper of the shoe such that a shoe produced according to this method can accommodate both the space for the creation of an/the internal cavity and the space for a foot of correct size. For example, a first last 100 may be of a larger size than a second last 100. The first last 100 may be longer vertically than the vertical length of a foot that would fit perfectly in the completed shoe (e.g., based on a size of the shoe and an intended foot size corresponding to the size of the shoe). The first last 100 may be used to last the upper material 115 and strobel board 125 of the shoe around and then removed. An insert or insole may then be inserted into the shoe which may complete the internal cavity. Next, a second smaller last 100 may be inserted, which is used to hold pressure on the shoe and insert or insole during the actual injection molding process. This second last 100 may be of similar or the same size as a user's foot which would fit in the completed shoe.

Last 100 is an example of, or includes aspects of, the corresponding element described with reference to FIGS. 11-14, 19-21, and 27-32. As described herein, more than one last 100 may be implemented. According to some embodiments, insole 105 comprises an upper surface and a lower surface. Insole 105 is an example of, or includes aspects of, the corresponding element described with reference to FIGS. 6, 7, 11-21, and 27-34. In one embodiment, insole 105 includes spacing structure 110.

According to some embodiments, spacing structure 110 is adjacent to the lower surface, wherein the insole 105 is adjacent to and generally parallel with the bottom of the shoe upper, whereby the spacing structure 110 maintains the insole 105 in a spaced-apart relationship from the bottom, and to define a cavity between the insole 105, the bottom, and the lower region of the sides. In some examples, the spacing structure 110 includes a spacing feature on the lower surface. In some examples, the spacing structure 110 includes a porous material in the cavity, and the molded material 120 is bonded to the porous material before or as the molded material hardens or sets. In some examples, the spacing structure 110 rests against a top side of the strobel board 125 to create the cavity between the insole 105 and the strobel board 125.

Spacing structure 110 is an example of, or includes aspects of, the corresponding element described with reference to FIGS. 6, 7, 15-21, 33, and 34. Upper material 115 is an example of, or includes aspects of, the corresponding element described with reference to FIGS. 2-5, and 10-34.

According to some embodiments, molded material 120 is substantially filling the cavity and covering a portion of the exterior adjacent to the lower region of the sides, wherein the molded material 120 is contiguous through the hole. In some examples, the molded material 120 is contiguous through another hole and rejoined with the molded material 120 contiguous through the hole. In some examples, the molded material 120 is bonded to the upper. In some examples, the molded material 120 is contiguous through the perforation and rejoined with material contiguous through the hole. In some examples, the molded material 120 covers a portion of the exterior adjacent to the bottom, and the molded material 120 is bonded through the perforation. In some examples, the molded material 120 includes an injection molded material 120. In some examples, the molded material 120 includes a pour molded material 120. In some examples, the molded material 120 covers a portion of the exterior adjacent to the bottom, and the molded material 120 is bonded through the overlapping portion.

In some examples, the strobel board 125 includes a perforation (e.g., a side perforation 135). In some examples, the strobel board 125 includes a plurality of perforations (e.g., strobel board perforations which face the internal cavity). Strobel board 125 is an example of, or includes aspects of, the corresponding element described with reference to FIGS. 8-14, 19-21, and 26-32.

According to some embodiments, outsole 130 is coupled to the molded material 120. Outsole 130 is an example of, or includes aspects of, the corresponding element described with reference to FIG. 21. Side perforations 135 is an example of, or includes aspects of, the corresponding element described with reference to FIGS. 2-5, and 10-34. Molded material 120 is an example of, or includes aspects of, the corresponding element described with reference to FIGS. 15-21, 33, and 34. Collar 140 is an example of, or includes aspects of, the corresponding element described with reference to FIGS. 2-5, 11-14, 22, 24, 25, and 27-32.

In some examples, collar 140 may be formed from a knit material through a knitting process. The collar 140 may serve to tightly cover and surround a portion of a user's ankle, as well as to provide support to the ankle area and to prevent debris from entering into the interior of the shoe.

The upper material 115 may be formed from a TPU/PU/PVC-based synthetic leather using a die cutting process, a knit material using a knitting process, a leather using a die cutting process, a textile using a die cutting process, a knitting or weaving process, or any process suitable for forming structurally stable members of the textile. The upper material 115 may be used in the lasting process to form the shape of the shoe and to surround, cover, and hold in place the foot of a user. The upper material 115 may also act as a medium to connect or house other elements of the shoe. The perimeter upper perforations (e.g., side perforations 135) may be formed by a laser cutting or die cutting process, and the perforations may serve to allow the flow of a liquid or semi-liquid material through itself.

Figure 2:
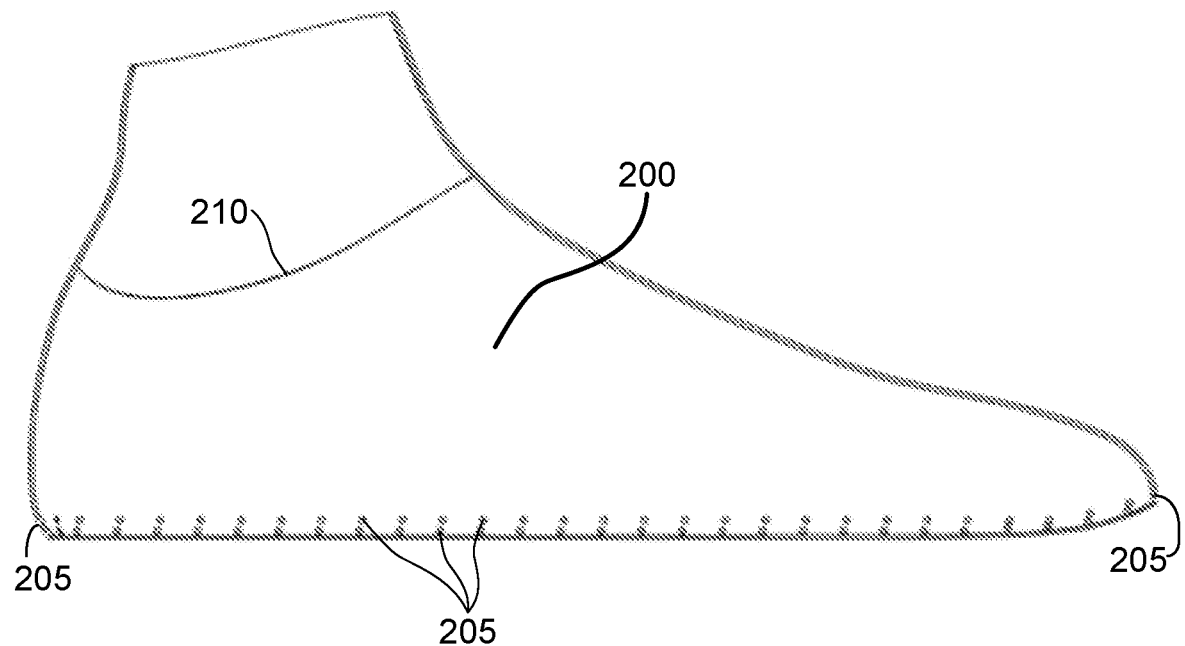
FIG. 2 shows an example of a side cross section of a shoe upper according to aspects of the present disclosure.

FIG. 2 shows an example of a side cross section of a shoe upper according to aspects of the present disclosure. The example shown includes upper material 200, side perforations 205, and collar 210. According to one or more aspects described herein, FIG. 2 may illustrate an example side cross section of a shoe upper. As shown, side perforations 205 may be along the side of the upper material 200 (e.g., around the lower perimeter of the upper material 200) and above the edge of a strobel board (not shown in FIG. 2).

Collar 210, which may be made of a knit material, TPU/PU/PVC-based synthetic leather material, textile materials, or other common materials, is connected to the upper material 200 (e.g., using stitching, adhesive, heat welding, or any other common method of connection).

The upper material 200 surrounds some or all of the user's (e.g., wearer's) foot. The upper material 200 may be made from a TPU/PU/PVC-based synthetic leather material, leather material, knit material, a textile material, etc. The upper material 200 may include a multitude of perimeter upper perforations (e.g., side perforations 205), which are a form of through holes where the hole passes entirely through the upper material 200. The perimeter upper perforations (e.g., side perforations 205) can take the shape of slots, circles, hexagons, or any other shape.

These perimeter upper perforations (e.g., side perforations 205) may puncture through the side edge of the upper material 200 shaped in a band surrounding the entire perimeter of the upper material 200 which may be located near to the underfoot portion of the upper material 200.

Upper material 200 is an example of, or includes aspects of, the corresponding element described with reference to FIGS. 1, 3-5, and 10-34. Side perforations 205 is an example of, or includes aspects of, the corresponding element described with reference to FIGS. 1, 3-5, and 10-34. Collar 210 is an example of, or includes aspects of, the corresponding element described with reference to FIGS. 1, 3-5, 11-14, 22, 24, 25, and 27-32.

Figure 3:
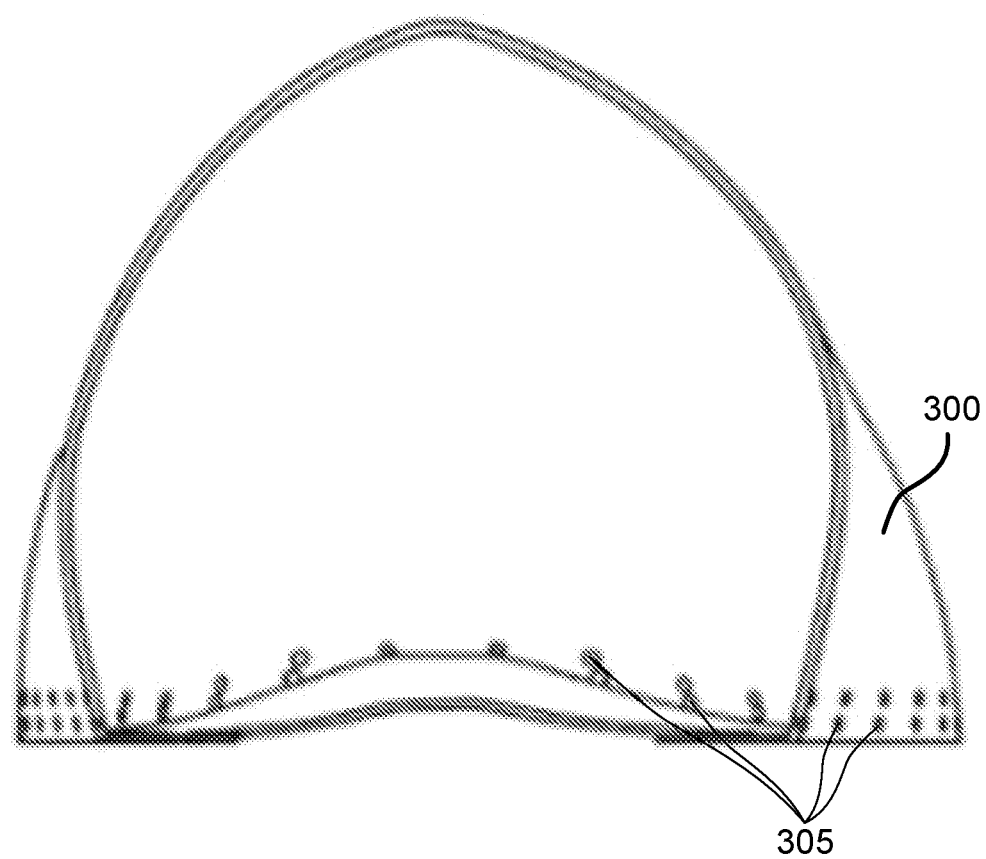
FIG. 3 shows an example of a front cross section of a shoe upper according to aspects of the present disclosure.

FIG. 3 shows an example of a front cross section of a shoe upper according to aspects of the present disclosure. The example shown includes upper material 300 and side perforations 305. According to one or more aspects described herein, FIG. 3 may illustrate an example front cross section of shoe upper (e.g., including side perforations 305 around the upper material 300).

Upper material 300 is an example of, or includes aspects of, the corresponding element described with reference to FIGS. 1, 2, 4, 5, and 10-34. Side perforations 305 is an example of, or includes aspects of, the corresponding element described with reference to FIGS. 1, 2, 4, 5, and 10-34.

Figure 4:
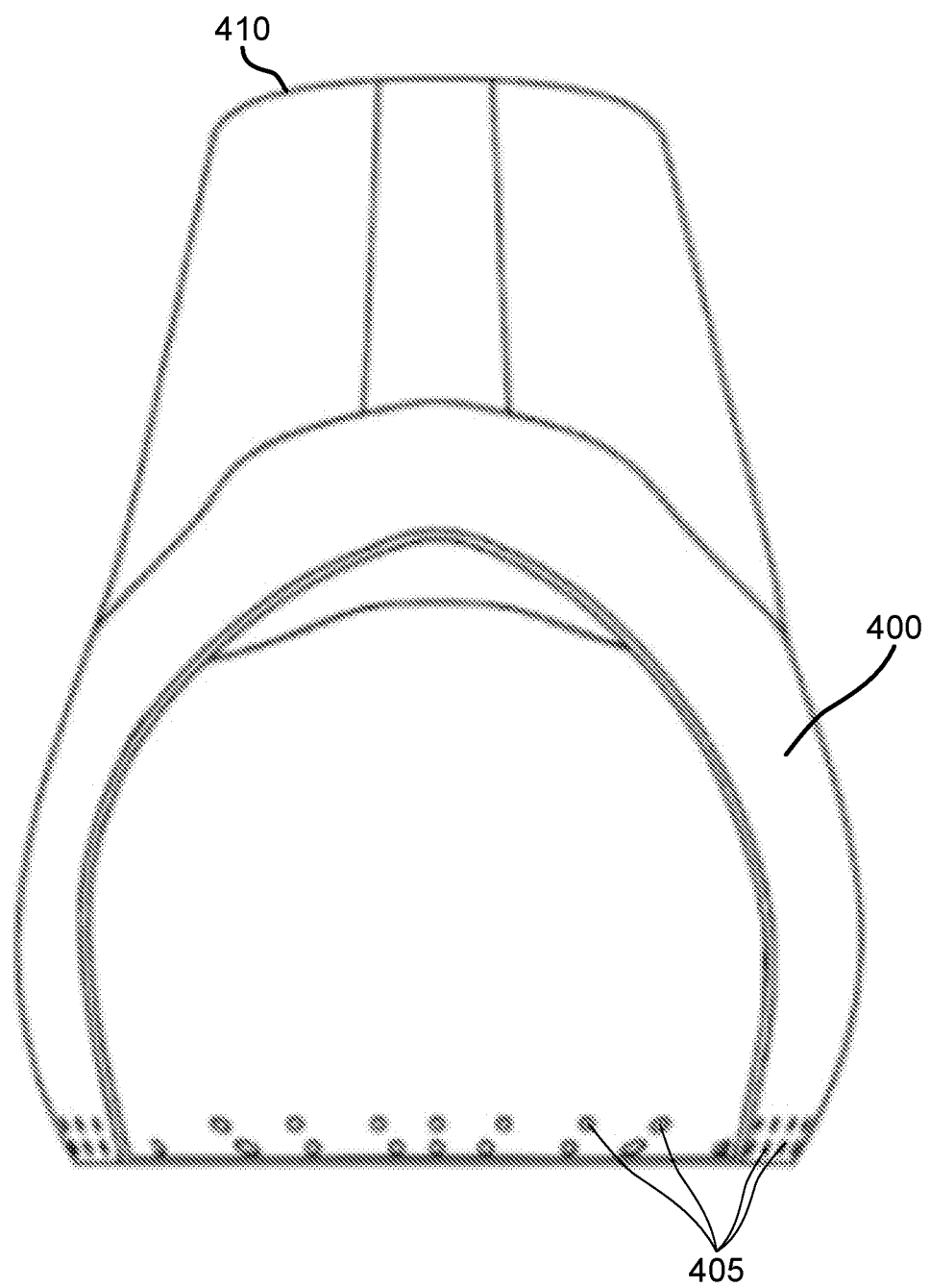
FIG. 4 shows an example of a rear cross section of a shoe upper according to aspects of the present disclosure.

FIG. 4 shows an example of a rear cross section of a shoe upper according to aspects of the present disclosure. The example shown includes upper material 400, side perforations 405, and collar 410. According to one or more aspects described herein, FIG. 4 may illustrate an example back cross section of shoe upper (e.g., including side perforations 405 around the upper material 400).

Upper material 400 is an example of, or includes aspects of, the corresponding element described with reference to FIGS. 1-3, 5, and 10-34. Side perforations 405 is an example of, or includes aspects of, the corresponding element described with reference to FIGS. 1-3, 5, and 10-34. Collar 410 is an example of, or includes aspects of, the corresponding element described with reference to FIGS. 1-3, 5, 11-14, 22, 24, 25, and 27-32.

Figure 5:
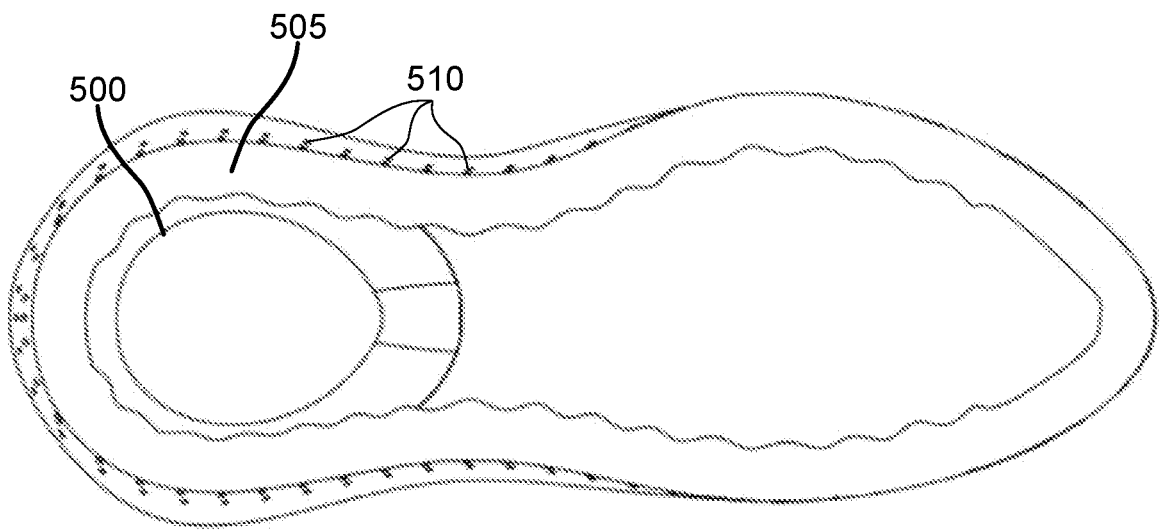
FIG. 5 shows an example of a bottom view of a shoe upper according to aspects of the present disclosure.

FIG. 5 shows an example of a bottom view of a shoe upper according to aspects of the present disclosure. The example shown includes collar 500, upper material 505, and side perforations 510. According to one or more aspects described herein, FIG. 5 may illustrate an example bottom view of shoe upper (e.g., including side perforations 510 around the upper material 505).

Collar 500 is an example of, or includes aspects of, the corresponding element described with reference to FIGS. 1-4, 11-14, 22, 24, 25, and 27-32. Upper material 505 is an example of, or includes aspects of, the corresponding element described with reference to FIGS. 1-4, and 10-34. Side perforations 510 is an example of, or includes aspects of, the corresponding element described with reference to FIGS. 1-4, and 10-34.

Figure 6:
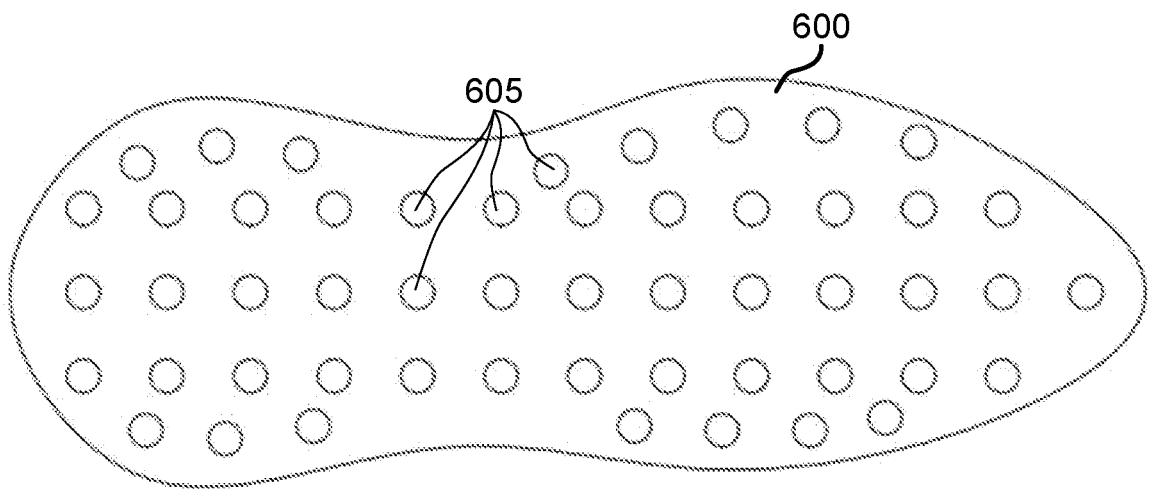
FIG. 6 shows an example of a bottom view of an insole according to aspects of the present disclosure.

FIG. 6 shows an example of a bottom view of an insole 600 according to aspects of the present disclosure. According to one or more aspects described herein, FIG. 6 may illustrate an example bottom view of an insole 600 including spacing structure 605 (e.g., where spacing structure 605 may include, for example, struts or other protrusions extending from insole 600).

Insole 600 is an example of, or includes aspects of, the corresponding element described with reference to FIGS. 1, 7, 11-21, and 27-34. In one embodiment, insole 600 includes spacing structure 605. Spacing structure 605 is an example of, or includes aspects of, the corresponding element described with reference to FIGS. 1, 7, 15-21, 33, and 34.

Figure 7:
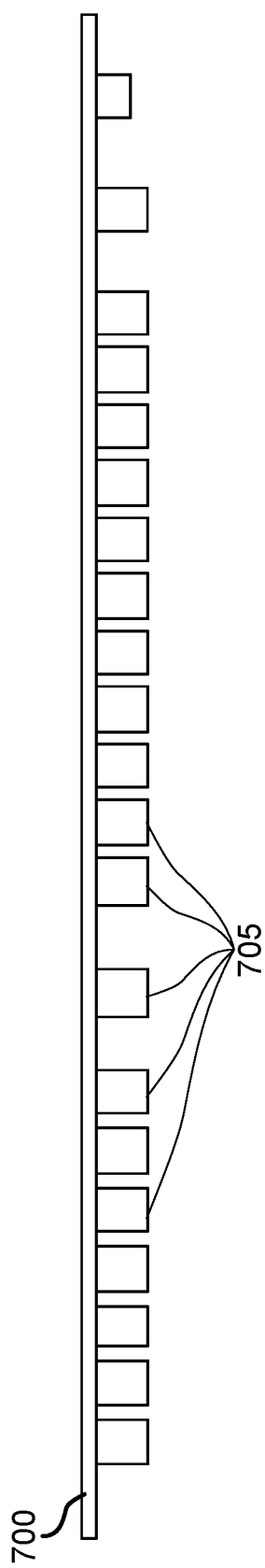
FIG. 7 shows an example of a side view of an insole according to aspects of the present disclosure.

FIG. 7 shows an example of a side view of an insole 700 according to aspects of the present disclosure. According to one or more aspects described herein, FIG. 7 may illustrate an example side view of an insole 700 including spacing structure 705 (e.g., where spacing structure 705 may include, for example, struts or other protrusions extending from insole 700).

Insole 700 is an example of, or includes aspects of, the corresponding element described with reference to FIGS. 1, 6, 11-21, and 27-34. In one embodiment, insole 700 includes spacing structure 705. Spacing structure 705 is an example of, or includes aspects of, the corresponding element described with reference to FIGS. 1, 6, 15-21, 33, and 34.

Figure 8:
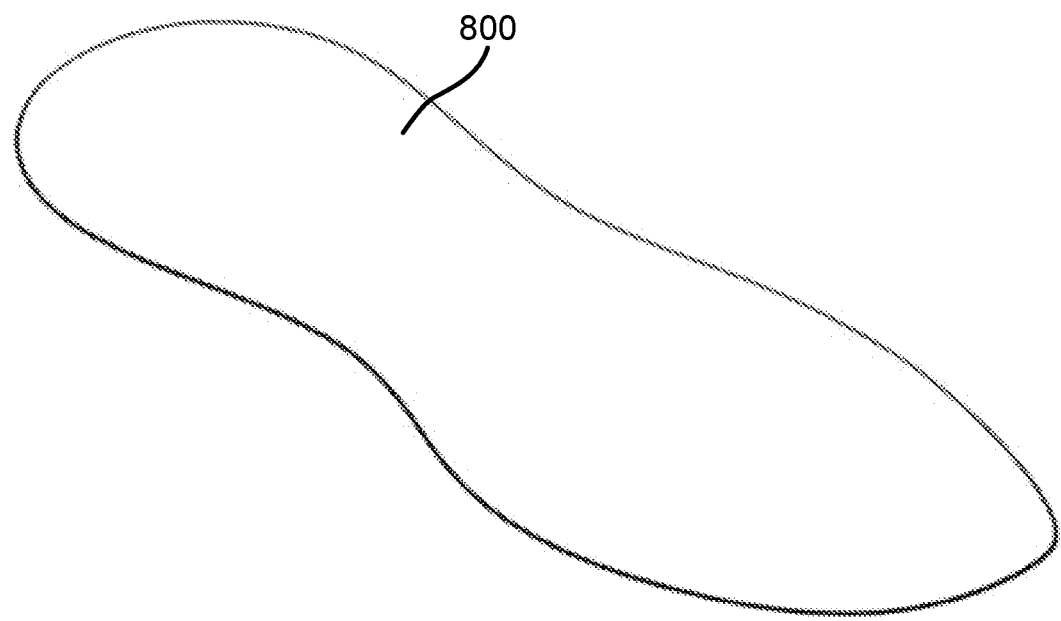
FIG. 8 shows an example of an isometric view of a strobel board according to aspects of the present disclosure.

FIG. 8 shows an example of an isometric view of a strobel board 800 according to aspects of the present disclosure. According to one or more aspects described herein, FIG. 8 may illustrate an example isometric view of a strobel board 800 (e.g., without strobel board perforations).

Strobel board 800 is an example of, or includes aspects of, the corresponding element described with reference to FIGS. 1, 9-14, 19-21, and 26-32.

Figure 9:
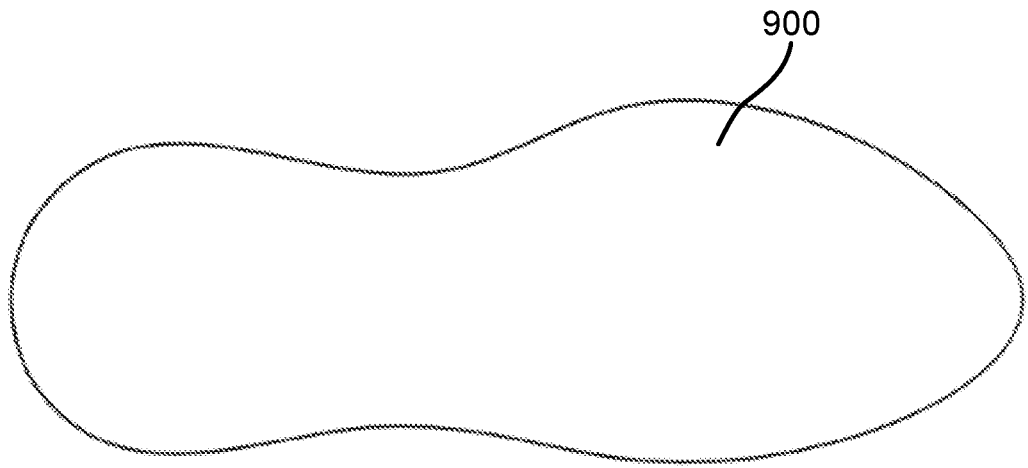
FIG. 9 shows an example of a bottom view of a strobel board according to aspects of the present disclosure.

FIG. 9 shows an example of a bottom view of a strobel board 900 according to aspects of the present disclosure. According to one or more aspects described herein, FIG. 9 may illustrate an example bottom view of a strobel board 900 (e.g., without strobel board perforations).

Strobel board 900 is an example of, or includes aspects of, the corresponding element described with reference to FIGS. 1, 8, 10-14, 19-21, and 26-32.

Figure 10:
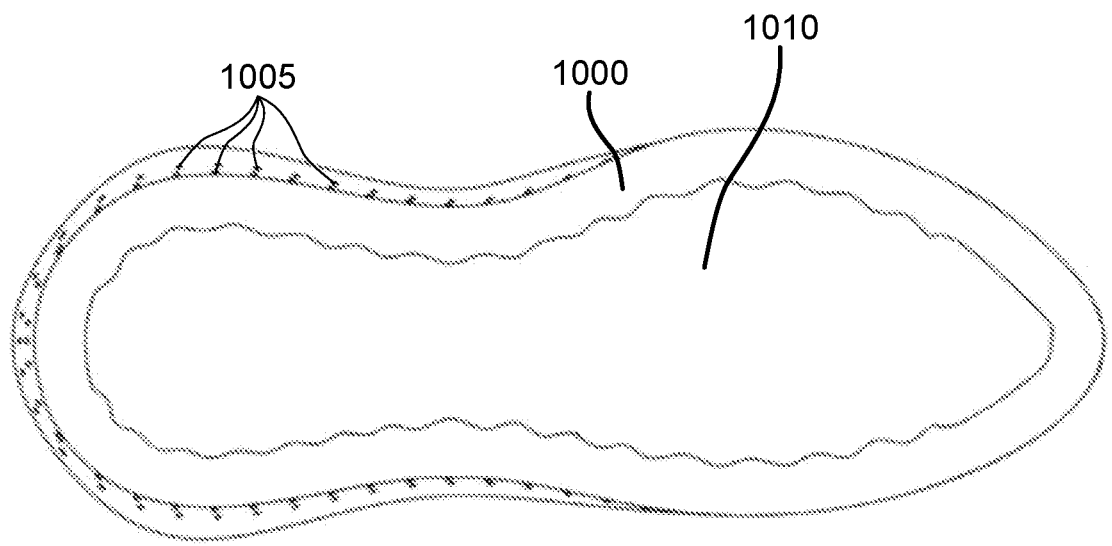
FIG. 10 shows an example of a bottom view of a lasted shoe upper according to aspects of the present disclosure.

FIG. 10 shows an example of a bottom view of a lasted shoe upper according to aspects of the present disclosure. The example shown includes upper material 1000, side perforations 1005, and strobel board 1010. According to one or more aspects described herein, FIG. 10 may illustrate an example bottom view of lasted shoe upper (e.g., upper material 1000 connected to strobel board 1010). FIG. 10 may illustrate aspects of a portion of the upper material 1000 which overlaps with the strobel board 1010 underneath the strobel board 1010 (e.g., underneath and around the perimeter of strobel board 1010).

Upper material 1000 is an example of, or includes aspects of, the corresponding element described with reference to FIGS. 1-5, and 11-34. Side perforations 1005 is an example of, or includes aspects of, the corresponding element described with reference to FIGS. 1-5, and 11-34. Strobel board 1010 is an example of, or includes aspects of, the corresponding element described with reference to FIGS. 1, 8, 9, 11-14, 19-21, and 26-32.

Figure 11:
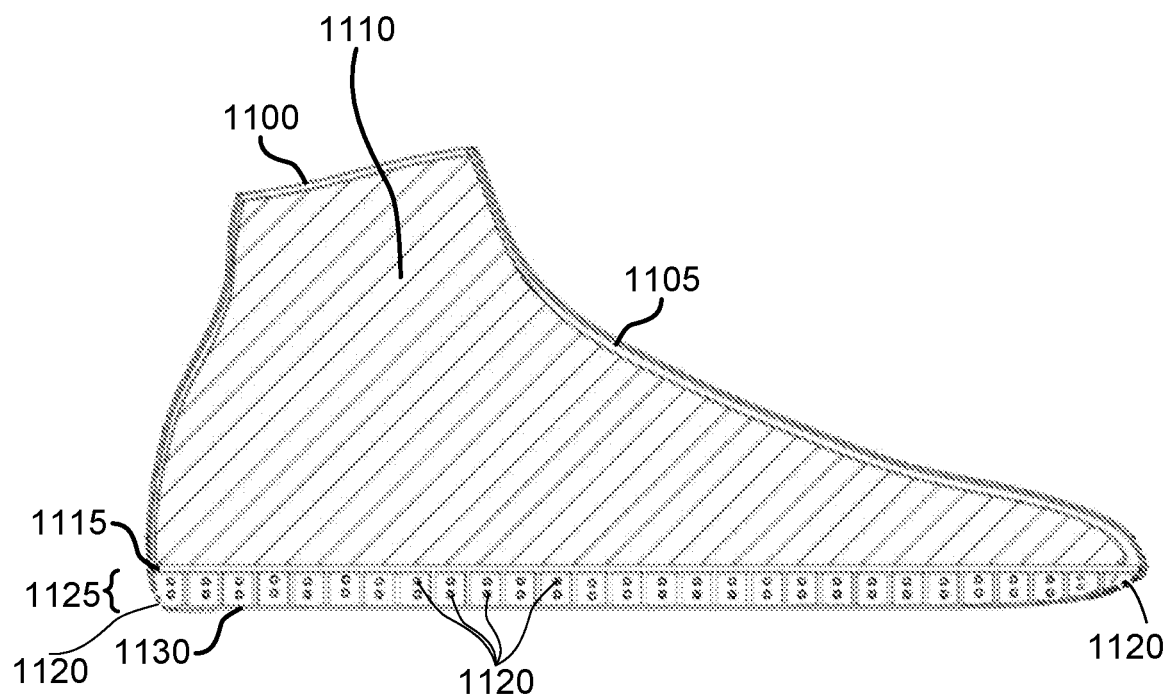
FIG. 11 shows an example of a side cross section of a lasted shoe pre-molding according to aspects of the present disclosure.

FIG. 11 shows an example of a side cross section of a lasted shoe pre-molding according to aspects of the present disclosure. The example shown includes collar 1100, upper material 1105, last 1110, insole 1115, side perforations 1120, internal cavity 1125, and strobel board 1130. According to one or more aspects described herein, FIG. 11 may illustrate an example side cross section of lasted shoe pre-molding. For instance, insole 1115 and strobel board 1130 may form an internal cavity 1125 (e.g., via a spacing structure forming a cavity or spacing between the insole 1115 and the strobel board 1130 within the upper material 1105). According to the techniques described herein, material may be injected into side perforations 1120 to fill the internal cavity 1125 and mold an integrated sole for the shoe.

Collar 1100 is an example of, or includes aspects of, the corresponding element described with reference to FIGS. 1-5, 12-14, 22, 24, 25, and 27-32. Upper material 1105 is an example of, or includes aspects of, the corresponding element described with reference to FIGS. 1-5, 10, and 12-34. Last 1110 is an example of, or includes aspects of, the corresponding element described with reference to FIGS. 1, 12-14, 19-21, and 27-32. Insole 1115 is an example of, or includes aspects of, the corresponding element described with reference to FIGS. 1, 6, 7, 12-21, and 27-34. Side perforations 1120 is an example of, or includes aspects of, the corresponding element described with reference to FIGS. 1-5, 10, and 12-34. Internal cavity 1125 is an example of, or includes aspects of, the corresponding element described with reference to FIGS. 12-18, 27, 28, and 31-34. Strobel board 1130 is an example of, or includes aspects of, the corresponding element described with reference to FIGS. 1, 8-10, 12-14, 19-21, and 26-32.

Figure 12:
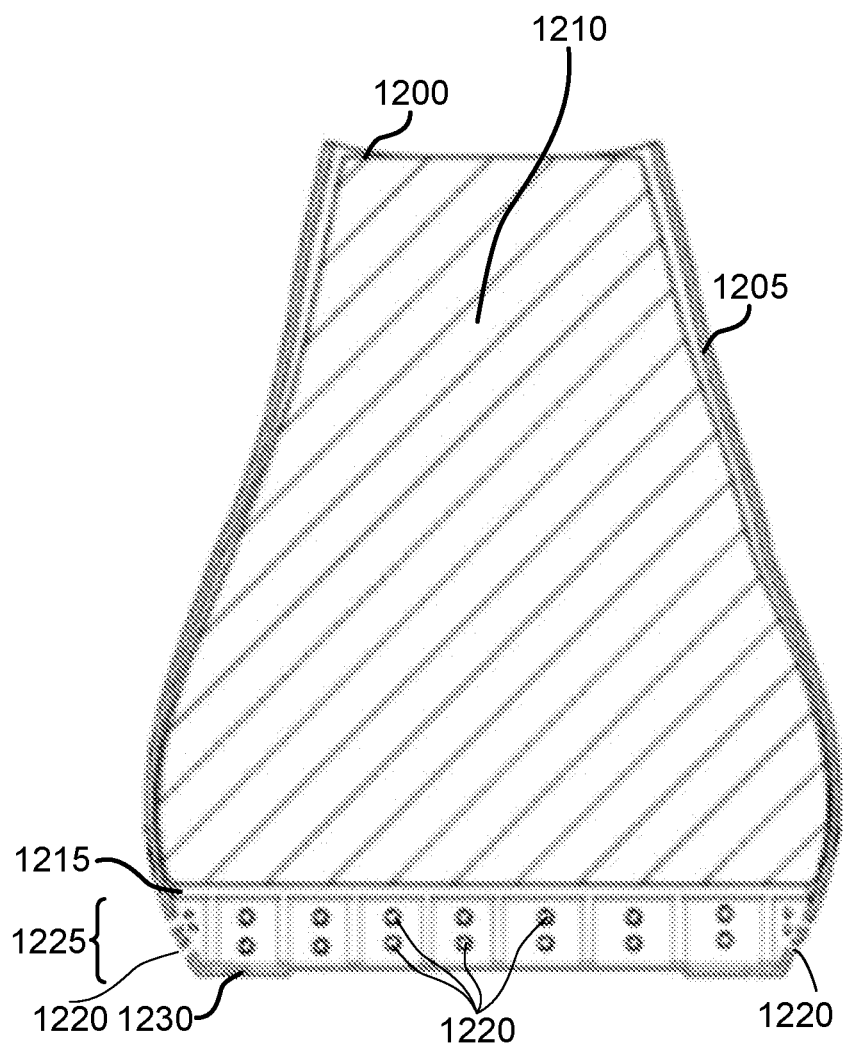
FIG. 12 shows an example of a rear cross section of a lasted upper pre-molding according to aspects of the present disclosure.

FIG. 12 shows an example of a rear cross section of a lasted upper pre-molding according to aspects of the present disclosure. The example shown includes collar 1200, upper material 1205, last 1210, insole 1215, side perforations 1220, internal cavity 1225, and strobel board 1230. According to one or more aspects described herein, FIG. 12 may illustrate an example rear cross section of a lasted upper pre-molding.

Collar 1200 is an example of, or includes aspects of, the corresponding element described with reference to FIGS. 1-5, 11, 13, 14, 22, 24, 25, and 27-32. Upper material 1205 is an example of, or includes aspects of, the corresponding element described with reference to FIGS. 1-5, 10, 11, and 13-34. Last 1210 is an example of, or includes aspects of, the corresponding element described with reference to FIGS. 1, 11, 13, 14, 19-21, and 27-32. Insole 1215 is an example of, or includes aspects of, the corresponding element described with reference to FIGS. 1, 6, 7, 11, 13-21, and 27-34. Side perforations 1220 is an example of, or includes aspects of, the corresponding element described with reference to FIGS. 1-5, 10, 11, and 13-34. Internal cavity 1225 is an example of, or includes aspects of, the corresponding element described with reference to FIGS. 11, 13-18, 27, 28, and 31-34. Strobel board 1230 is an example of, or includes aspects of, the corresponding element described with reference to FIGS. 1, 8-11, 13, 14, 19-21, and 26-32.

Figure 13:
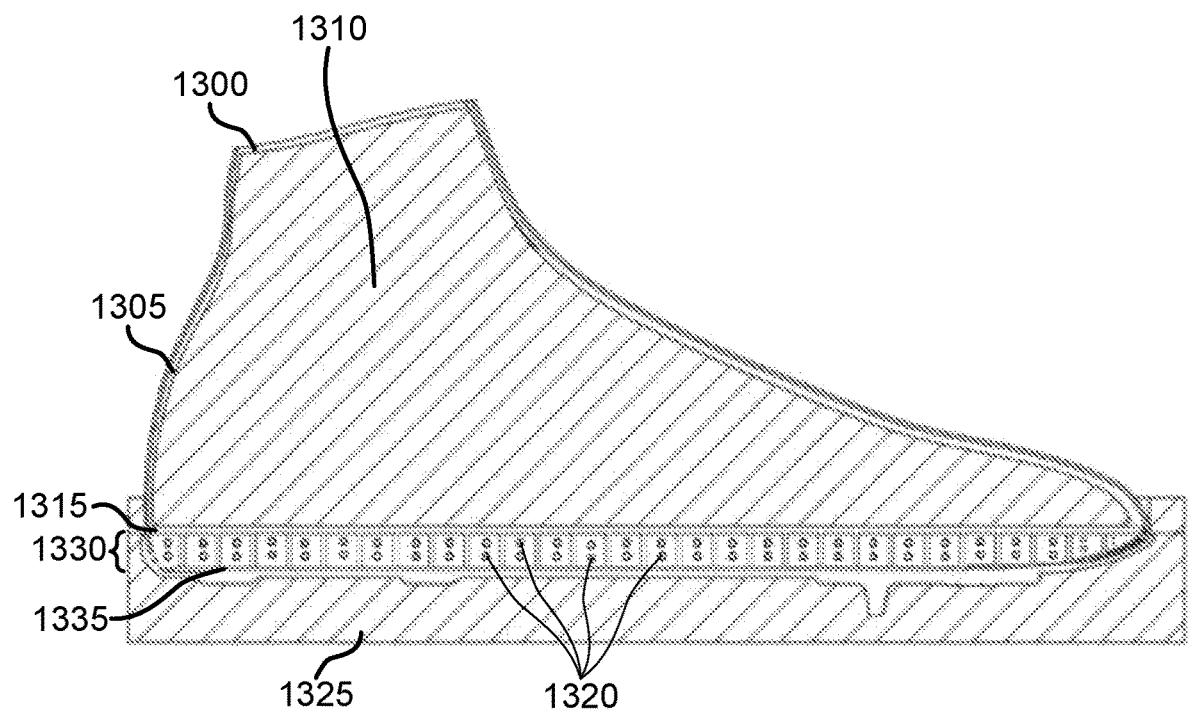
FIG. 13 shows an example of a side cross section of a lasted upper in mold pre-molding according to aspects of the present disclosure.

FIG. 13 shows an example of a side cross section of a lasted upper in mold 1325 pre-molding according to aspects of the present disclosure. The example shown includes collar 1300, upper material 1305, last 1310, insole 1315, side perforations 1320, mold 1325, internal cavity 1330, and strobel board 1335. According to one or more aspects described herein, FIG. 13 may illustrate an example side cross section of lasted upper in a mold 1325 pre-molding.

Collar 1300 is an example of, or includes aspects of, the corresponding element described with reference to FIGS. 1-5, 11, 12, 14, 22, 24, 25, and 27-32. Upper material 1305 is an example of, or includes aspects of, the corresponding element described with reference to FIGS. 1-5, 10-12, and 14-34. Last 1310 is an example of, or includes aspects of, the corresponding element described with reference to FIGS. 1, 11, 12, 14, 19-21, and 27-32. Insole 1315 is an example of, or includes aspects of, the corresponding element described with reference to FIGS. 1, 6, 7, 11, 12, 14-21, and 27-34. Side perforations 1320 is an example of, or includes aspects of, the corresponding element described with reference to FIGS. 1-5, 10-12, and 14-34. Mold 1325 is an example of, or includes aspects of, the corresponding element described with reference to FIGS. 14, 19, 20, 31, and 32. Internal cavity 1330 is an example of, or includes aspects of, the corresponding element described with reference to FIGS. 11, 12, 14-18, 27, 28, and 31-34. Strobel board 1335 is an example of, or includes aspects of, the corresponding element described with reference to FIGS. 1, 8-12, 14, 19-21, and 26-32.

Figure 14:
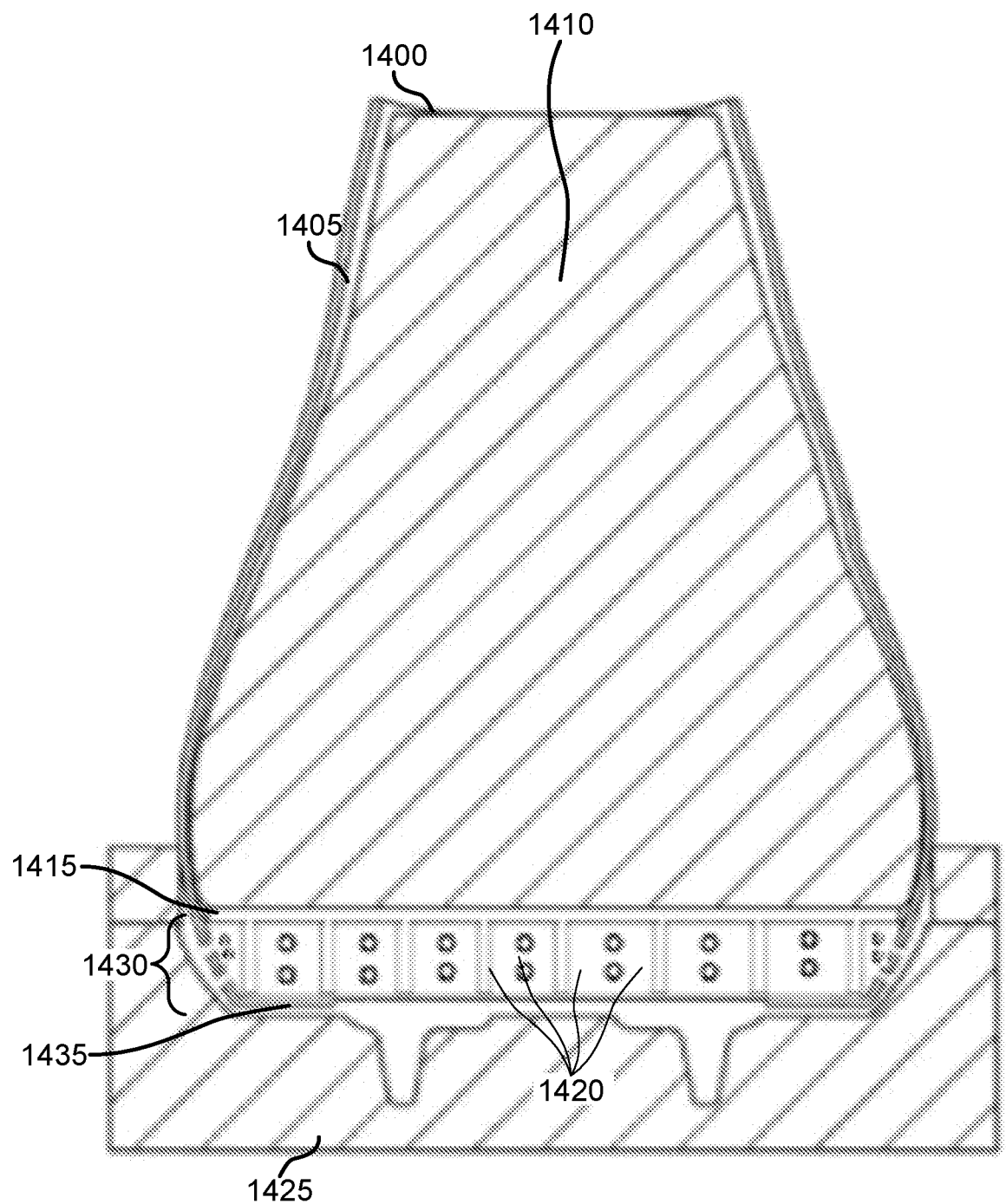
FIG. 14 shows an example of a rear cross section of a lasted upper in mold pre-molding according to aspects of the present disclosure.

FIG. 14 shows an example of a rear cross section of a lasted upper in mold 1425 pre-molding according to aspects of the present disclosure. The example shown includes collar 1400, upper material 1405, last 1410, insole 1415, side perforations 1420, mold 1425, internal cavity 1430, and strobel board 1435. According to one or more aspects described herein, FIG. 14 may illustrate an example rear cross section of lasted upper in mold 1425 pre-molding.

Collar 1400 is an example of, or includes aspects of, the corresponding element described with reference to FIGS. 1-5, 11-13, 22, 24, 25, and 27-32. Upper material 1405 is an example of, or includes aspects of, the corresponding element described with reference to FIGS. 1-5, 10-13, and 15-34. Last 1410 is an example of, or includes aspects of, the corresponding element described with reference to FIGS. 1, 11-13, 19-21, and 27-32. Insole 1415 is an example of, or includes aspects of, the corresponding element described with reference to FIGS. 1, 6, 7, 11-13, 15-21, and 27-34.

Side perforations 1420 is an example of, or includes aspects of, the corresponding element described with reference to FIGS. 1-5, 10-13, and 15-34. Mold 1425 is an example of, or includes aspects of, the corresponding element described with reference to FIGS. 13, 19, 20, 31, and 32. Internal cavity 1430 is an example of, or includes aspects of, the corresponding element described with reference to FIGS. 11-13, 15-18, 27, 28, and 31-34. Strobel board 1435 is an example of, or includes aspects of, the corresponding element described with reference to FIGS. 1, 8-13, 19-21, and 26-32.

Figure 15:
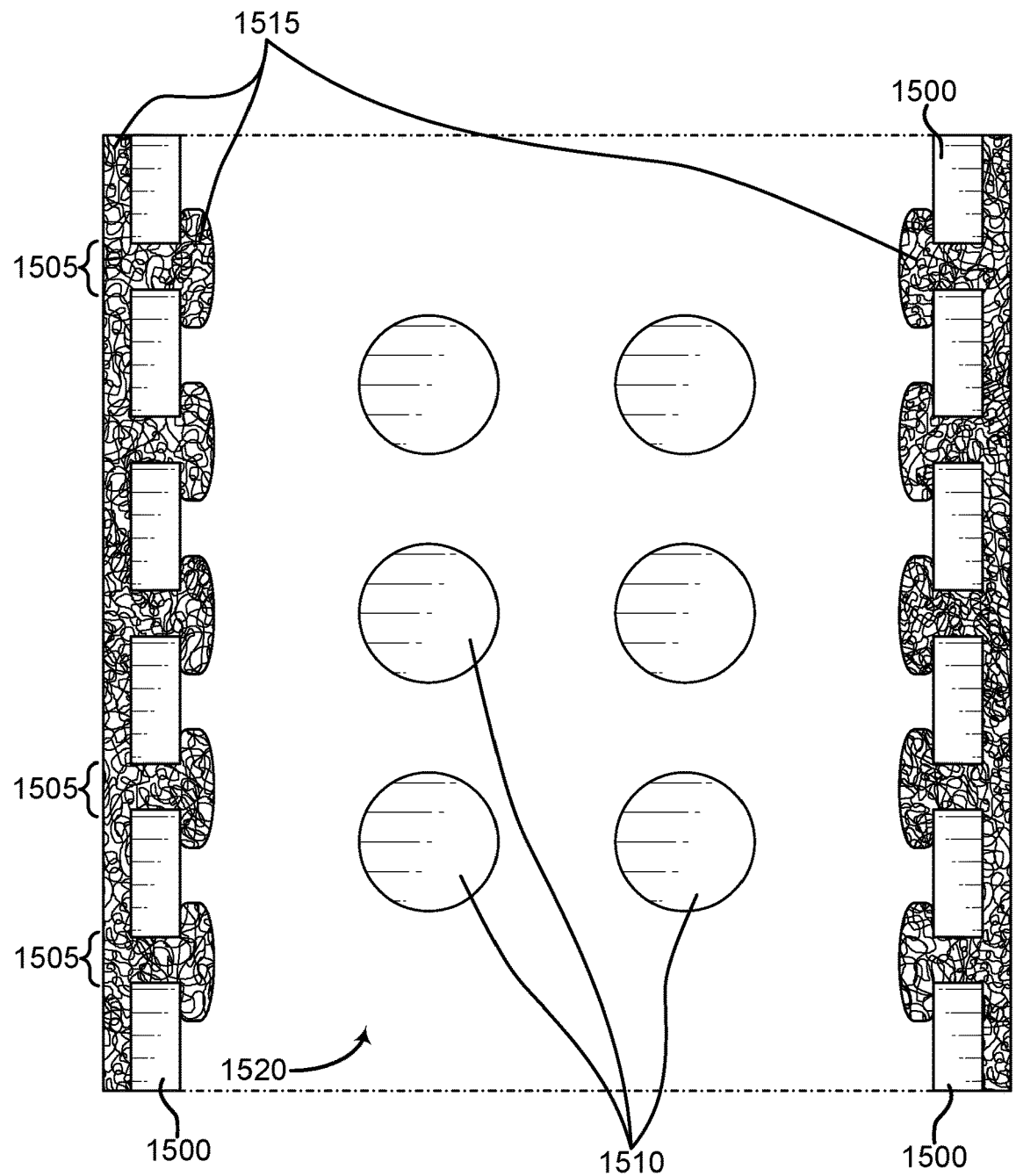
FIGS. 15 through 18 show examples of an injected material flow diagram according to aspects of the present disclosure.

FIG. 15 shows an example of an injected material flow diagram according to aspects of the present disclosure. The example shown includes upper material 1500, side perforations 1505, spacing structure 1510, molded material 1515, and internal cavity 1520. According to one or more aspects described herein, FIG. 15 may illustrate an example of flowing injected material into an internal cavity 1520 through side perforations 1505 (e.g., an example where material first enters the internal cavity 1520, such as at or near the beginning of a molding injection process).

Upper material 1500 is an example of, or includes aspects of, the corresponding element described with reference to FIGS. 1-5, 10-14, and 16-34. Side perforations 1505 is an example of, or includes aspects of, the corresponding element described with reference to FIGS. 1-5, 10-14, and 16-34. Spacing structure 1510 is an example of, or includes aspects of, the corresponding element described with reference to FIGS. 1, 6, 7, 16-21, 33, and 34. Molded material 1515 is an example of, or includes aspects of, the corresponding element described with reference to FIGS. 1, 16-21, 33, and 34. Internal cavity 1520 is an example of, or includes aspects of, the corresponding element described with reference to FIGS. 11-14, 16-18, 27, 28, and 31-34.

Figure 16:
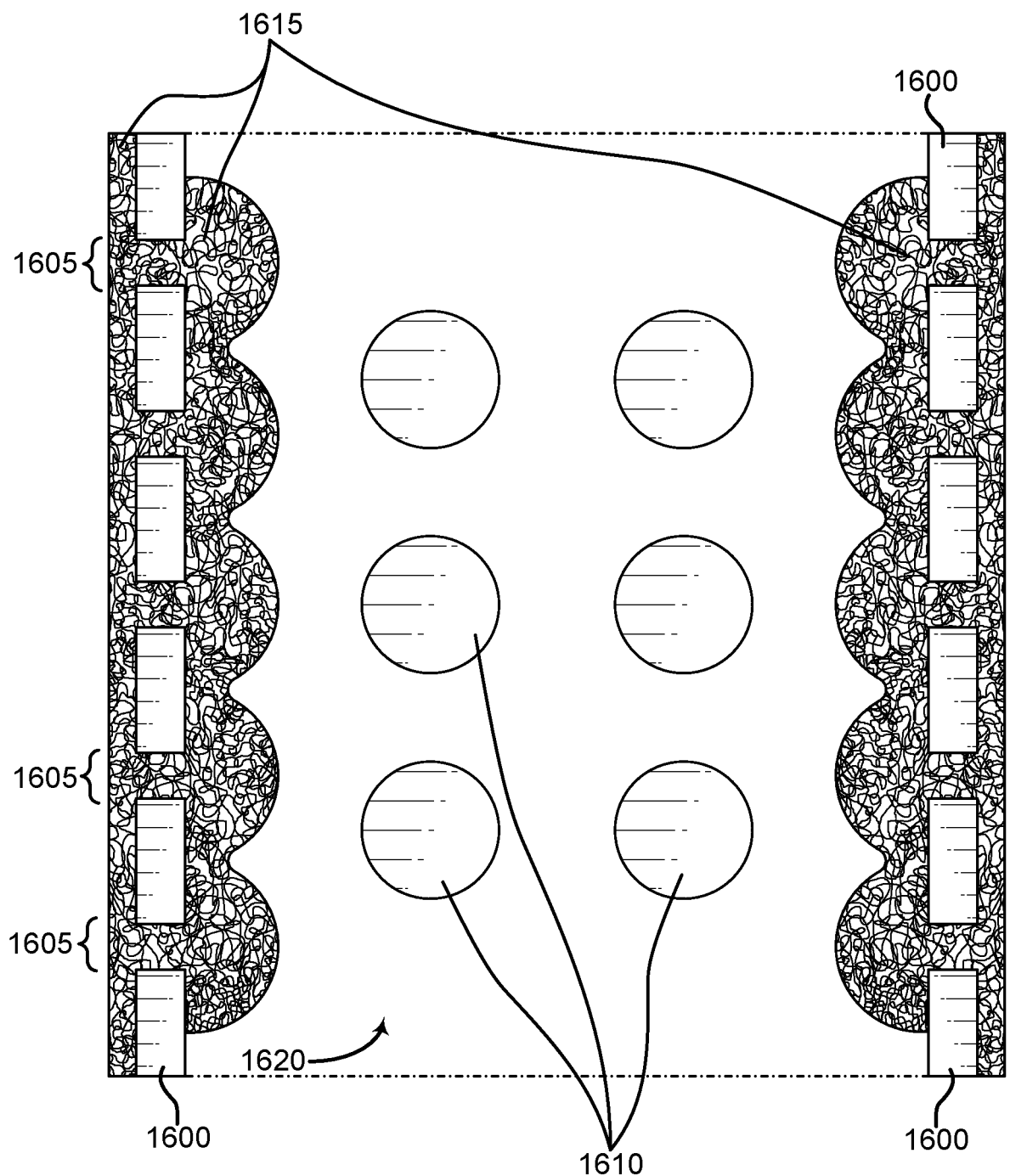

FIG. 16 shows an example of an injected material flow diagram according to aspects of the present disclosure. The example shown includes upper material 1600, side perforations 1605, spacing structure 1610, molded material 1615, and internal cavity 1620. According to one or more aspects described herein, FIG. 16 may illustrate an example of flowing injected material into internal cavity 1620 through side perforations 1605 (e.g., where injected material first rejoins around the side perforations 1605).

Upper material 1600 is an example of, or includes aspects of, the corresponding element described with reference to FIGS. 1-5, 10-15, and 17-34. Side perforations 1605 is an example of, or includes aspects of, the corresponding element described with reference to FIGS. 1-5, 10-15, and 17-34. Spacing structure 1610 is an example of, or includes aspects of, the corresponding element described with reference to FIGS. 1, 6, 7, 15, 17-21, 33, and 34. Molded material 1615 is an example of, or includes aspects of, the corresponding element described with reference to FIGS. 1, 15, 17-21, 33, and 34. The molded material 1615 from adjacent ones of the side perforations 1605 is shown rejoining to form a re-unified molded flow into the internal cavity 1620, i.e., not defined by the individual side perforation as initially would be the case, for example, in FIG. 15. Internal cavity 1620 is an example of, or includes aspects of, the corresponding element described with reference to FIGS. 11-15, 17, 18, 27, 28, and 31-34.

Figure 17:
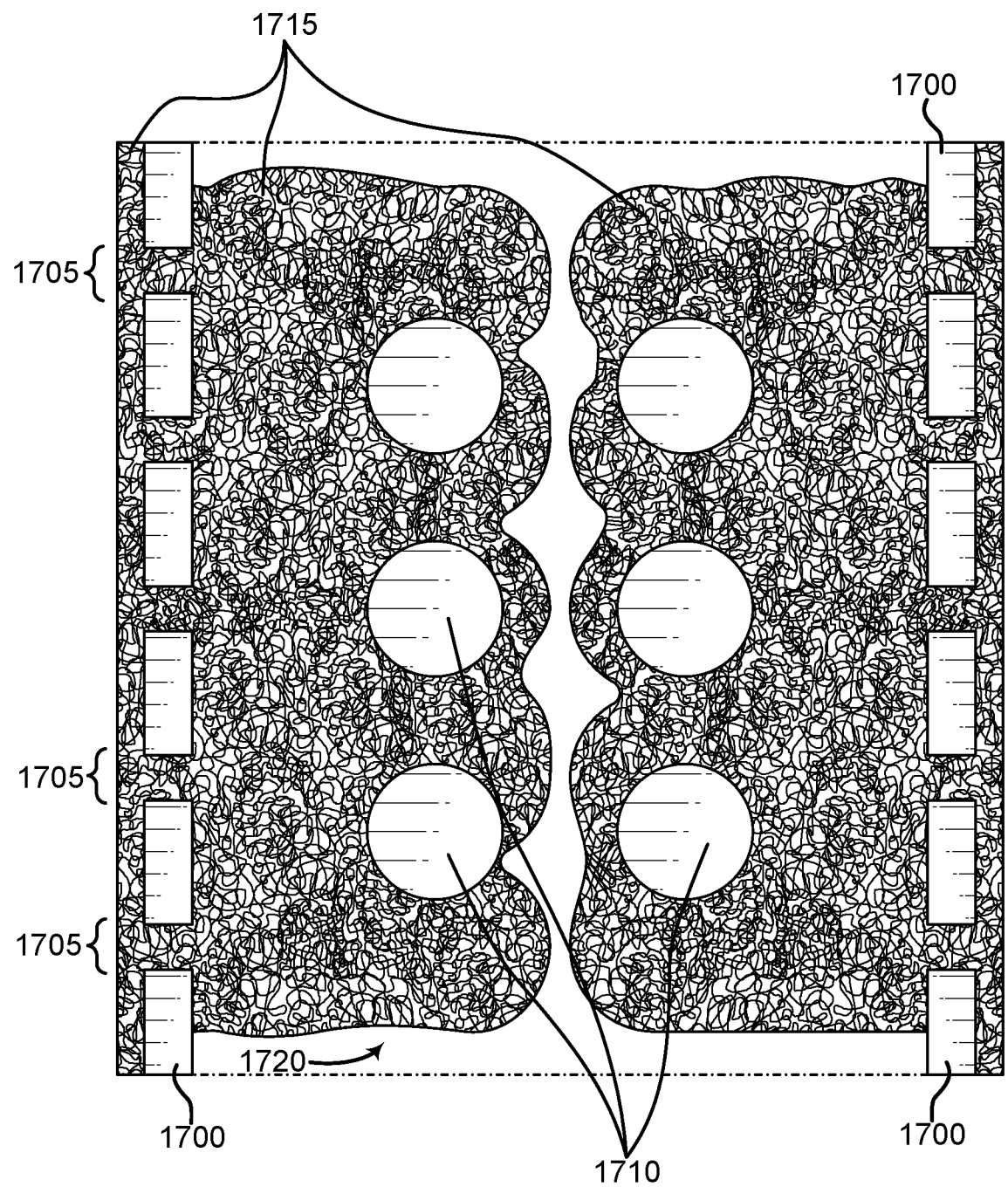

FIG. 17 shows an example of an injected material flow diagram according to aspects of the present disclosure. The example shown includes upper material 1700, side perforations 1705, spacing structure 1710, molded material 1715, and internal cavity 1720. According to one or more aspects described herein, FIG. 17 may illustrate an example of flowing injected material into internal cavity 1720 through side perforations 1705 (e.g., where material continues filling cavity in continuation from FIGS. 15 and 16).

Upper material 1700 is an example of, or includes aspects of, the corresponding element described with reference to FIGS. 1-5, 10-16, and 18-34. Side perforations 1705 is an example of, or includes aspects of, the corresponding element described with reference to FIGS. 1-5, 10-16, and 18-34. Spacing structure 1710 is an example of, or includes aspects of, the corresponding element described with reference to FIGS. 1, 6, 7, 15, 16, 18-21, 33, and 34. Molded material 1715 is an example of, or includes aspects of, the corresponding element described with reference to FIGS. 1, 15, 16, 18-21, 33, and 34. Internal cavity 1720 is an example of, or includes aspects of, the corresponding element described with reference to FIGS. 11-16, 18, 27, 28, and 31-34.

Figure 18:
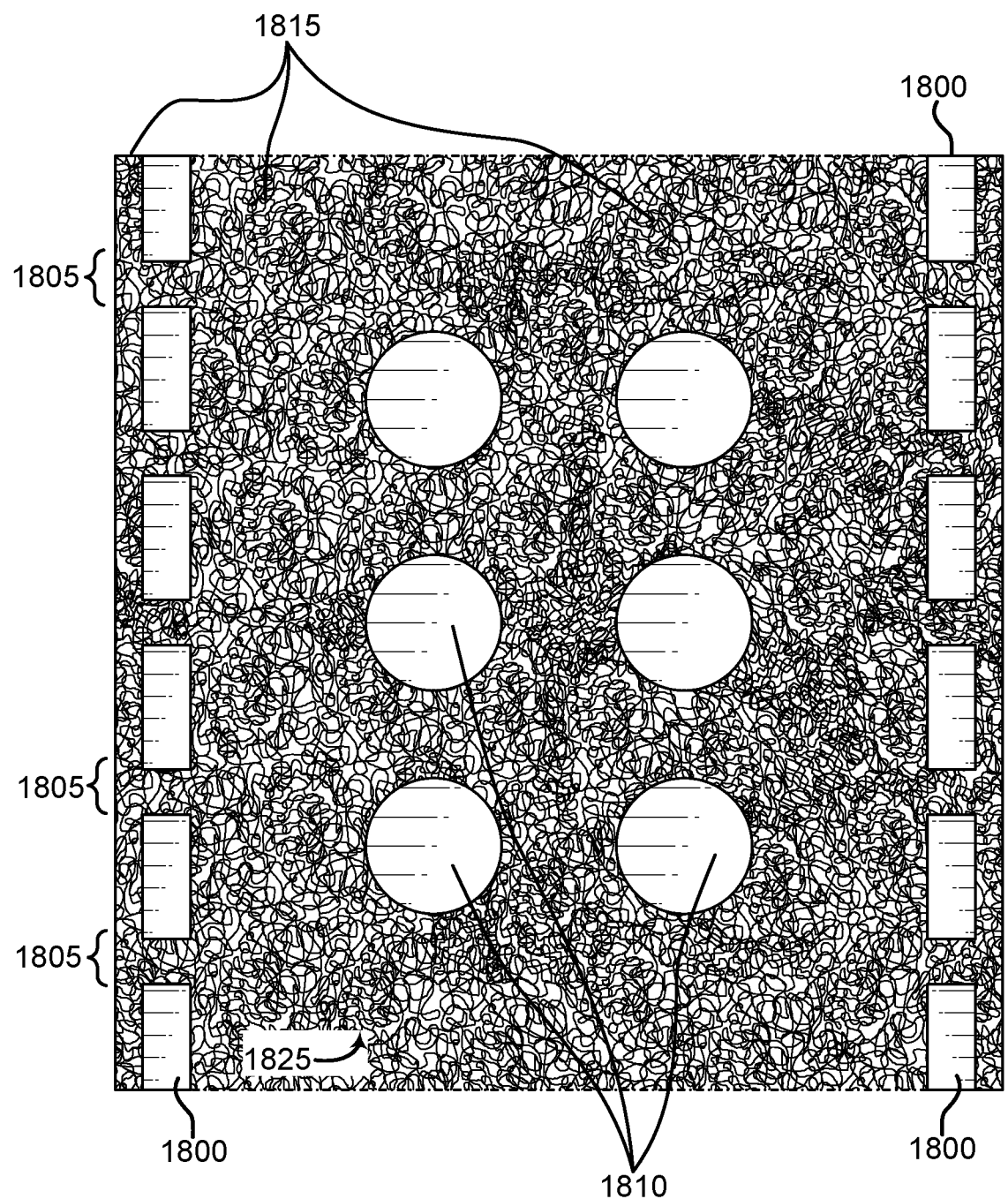

FIG. 18 shows an example of an injected material flow diagram according to aspects of the present disclosure. The example shown includes upper material 1800, side perforations 1805, spacing structure 1810, molded material 1815, insole 1820, and internal cavity 1825. According to one or more aspects described herein, FIG. 18 may illustrate an example of flowing injected material into internal cavity 1825 through side perforations 1805 (e.g., where material fully fills the internal cavity 1825 and rejoins other material throughout the internal cavity 1825).

Upper material 1800 is an example of, or includes aspects of, the corresponding element described with reference to FIGS. 1-5, 10-17, and 19-34. Side perforations 1805 is an example of, or includes aspects of, the corresponding element described with reference to FIGS. 1-5, 10-17, and 19-34. Spacing structure 1810 is an example of, or includes aspects of, the corresponding element described with reference to FIGS. 1, 6, 7, 15-17, 19-21, 33, and 34. Molded material 1815 is an example of, or includes aspects of, the corresponding element described with reference to FIGS. 1, 15-17, 19-21, 33, and 34. Insole 1820 is an example of, or includes aspects of, the corresponding element described with reference to FIGS. 1, 6, 7, 11-17, 19-21, and 27-34. Internal cavity 1825 is an example of, or includes aspects of, the corresponding element described with reference to FIGS. 11-17, 27, 28, and 31-34.

Figure 19:
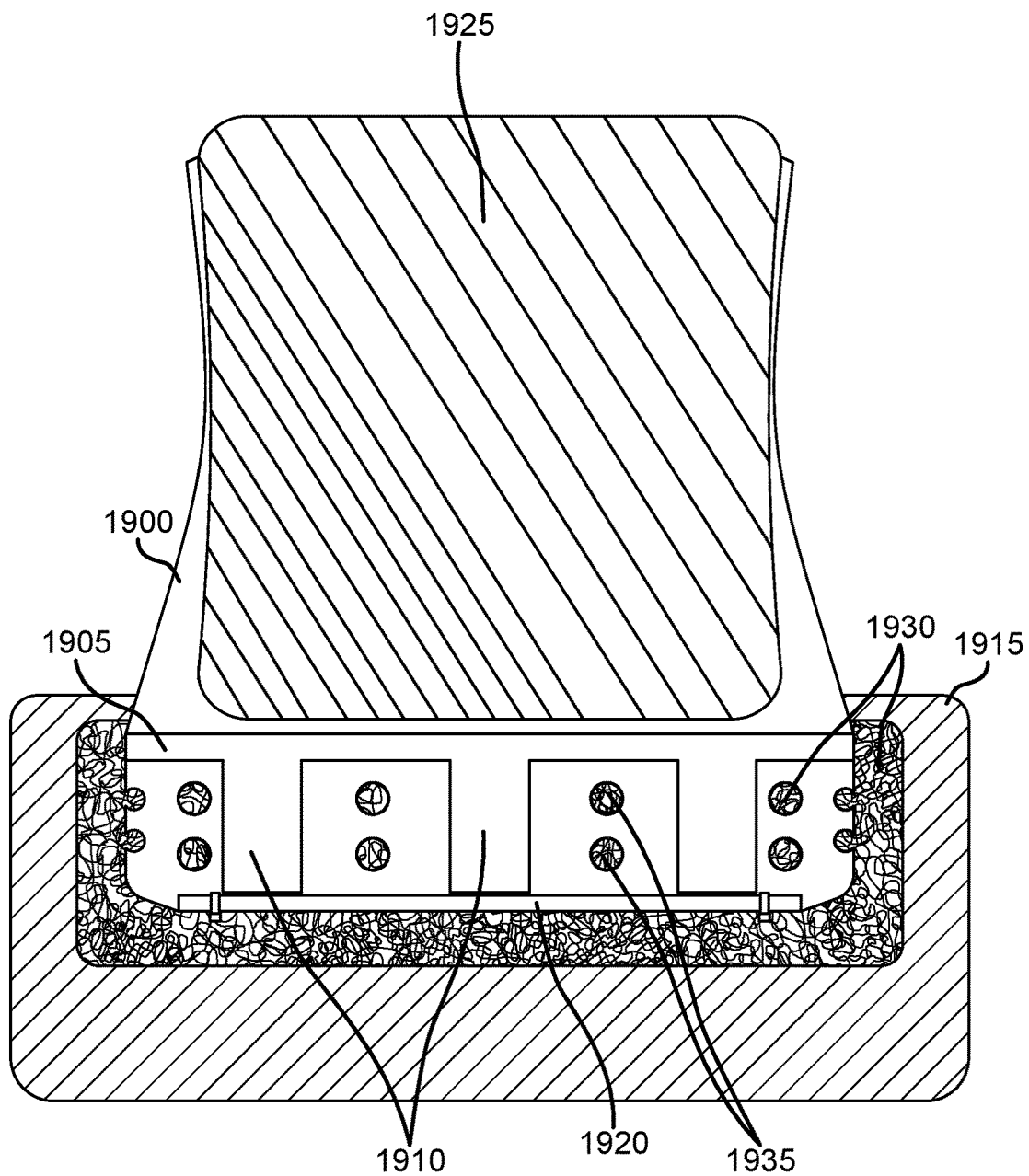
FIG. 19 shows an example of a rear cross section of an injected material flow diagram according to aspects of the present disclosure.

FIG. 19 shows an example of a rear cross section of an injected material flow diagram according to aspects of the present disclosure. The example shown includes upper material 1900, insole 1905, spacing structure 1910, mold 1915, strobel board 1920, last 1925, molded material 1930, and side perforations 1935. According to one or more aspects described herein, FIG. 19 may illustrate a rear cross section example of flowing injected material into an internal cavity through side perforations 1935 (e.g., where material first enters the internal cavity).

Upper material 1900 is an example of, or includes aspects of, the corresponding element described with reference to FIGS. 1-5, 10-18, and 20-34. Insole 1905 is an example of, or includes aspects of, the corresponding element described with reference to FIGS. 1, 6, 7, 11-18, 20, 21, and 27-34. Spacing structure 1910 is an example of, or includes aspects of, the corresponding element described with reference to FIGS. 1, 6, 7, 15-18, 20, 21, 33, and 34. Mold 1915 is an example of, or includes aspects of, the corresponding element described with reference to FIGS. 13, 14, 20, 31, and 32. Strobel board 1920 is an example of, or includes aspects of, the corresponding element described with reference to FIGS. 1, 8-14, 20, 21, and 26-32. Last 1925 is an example of, or includes aspects of, the corresponding element described with reference to FIGS. 1, 11-14, 20, 21, and 27-32. Molded material 1930 is an example of, or includes aspects of, the corresponding element described with reference to FIGS. 1, 15-18, 20, 21, 33, and 34. Side perforations 1935 is an example of, or includes aspects of, the corresponding element described with reference to FIGS. 1-5, 10-18, and 20-34.

Figure 20:
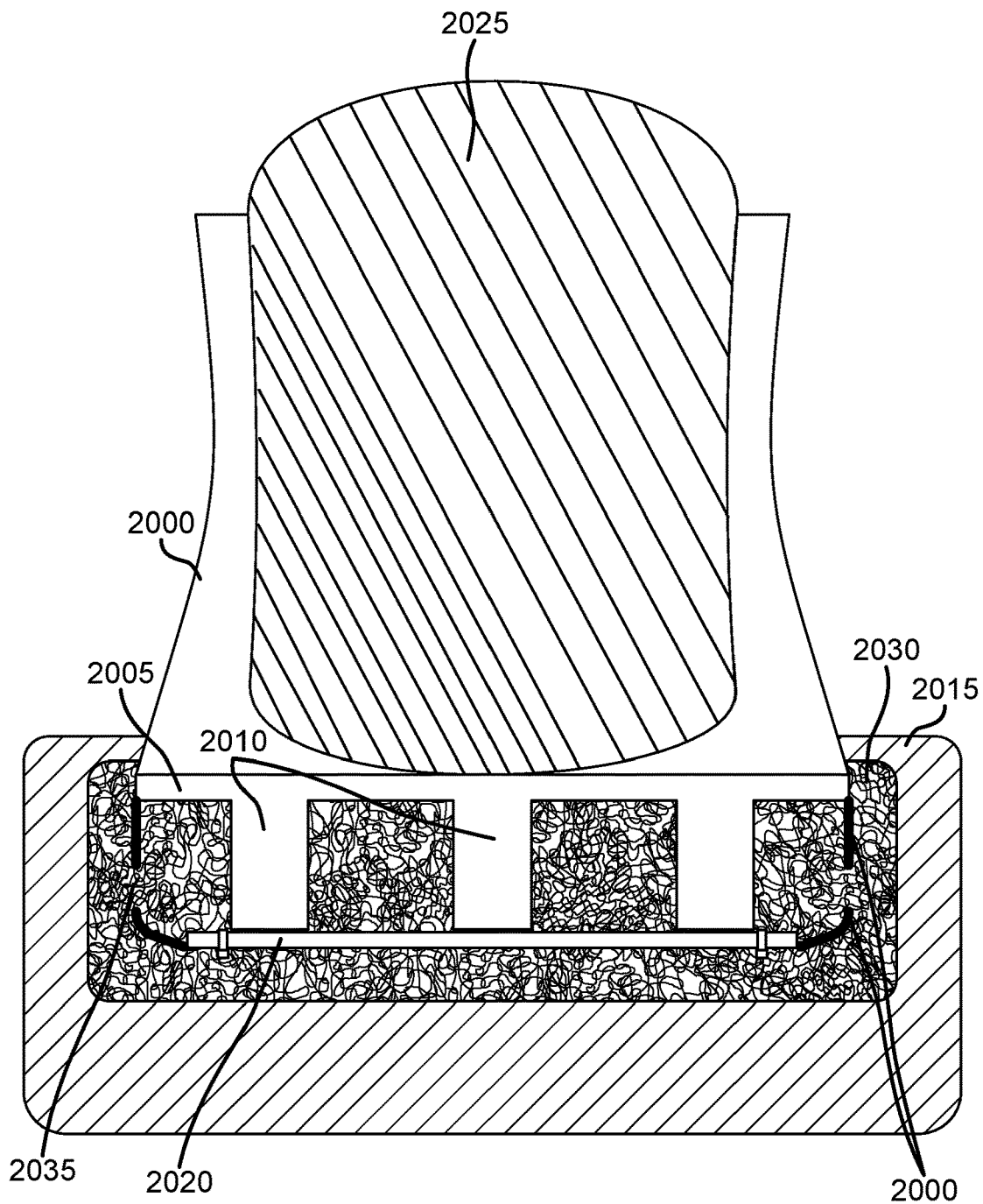
FIG. 20 shows an example of an injected material flow diagram according to aspects of the present disclosure.

FIG. 20 shows an example of an injected material flow diagram according to aspects of the present disclosure. The example shown includes upper material 2000, insole 2005, spacing structure 2010, mold 2015, strobel board 2020, last 2025, molded material 2030, and side perforations 2035. According to one or more aspects described herein, FIG. 20 may illustrate a rear cross section example of flowing injected material into internal cavity through side perforations (e.g., material fully fills cavity and rejoins other material in the cavity).

Upper material 2000 is an example of, or includes aspects of, the corresponding element described with reference to FIGS. 1-5, 10-19, and 21-34. Insole 2005 is an example of, or includes aspects of, the corresponding element described with reference to FIGS. 1, 6, 7, 11-19, 21, and 27-34. Spacing structure 2010 is an example of, or includes aspects of, the corresponding element described with reference to FIGS. 1, 6, 7, 15-19, 21, 33, and 34. Mold 2015 is an example of, or includes aspects of, the corresponding element described with reference to FIGS. 13, 14, 19, 31, and 32. Strobel board 2020 is an example of, or includes aspects of, the corresponding element described with reference to FIGS. 1, 8-14, 19, 21, and 26-32. Last 2025 is an example of, or includes aspects of, the corresponding element described with reference to FIGS. 1, 11-14, 19, 21, and 27-32. Molded material 2030 is an example of, or includes aspects of, the corresponding element described with reference to FIGS. 1, 15-19, 21, 33, and 34. Side perforations 2035 is an example of, or includes aspects of, the corresponding element described with reference to FIGS. 1-5, 10-19, and 21-34.

Figure 21:
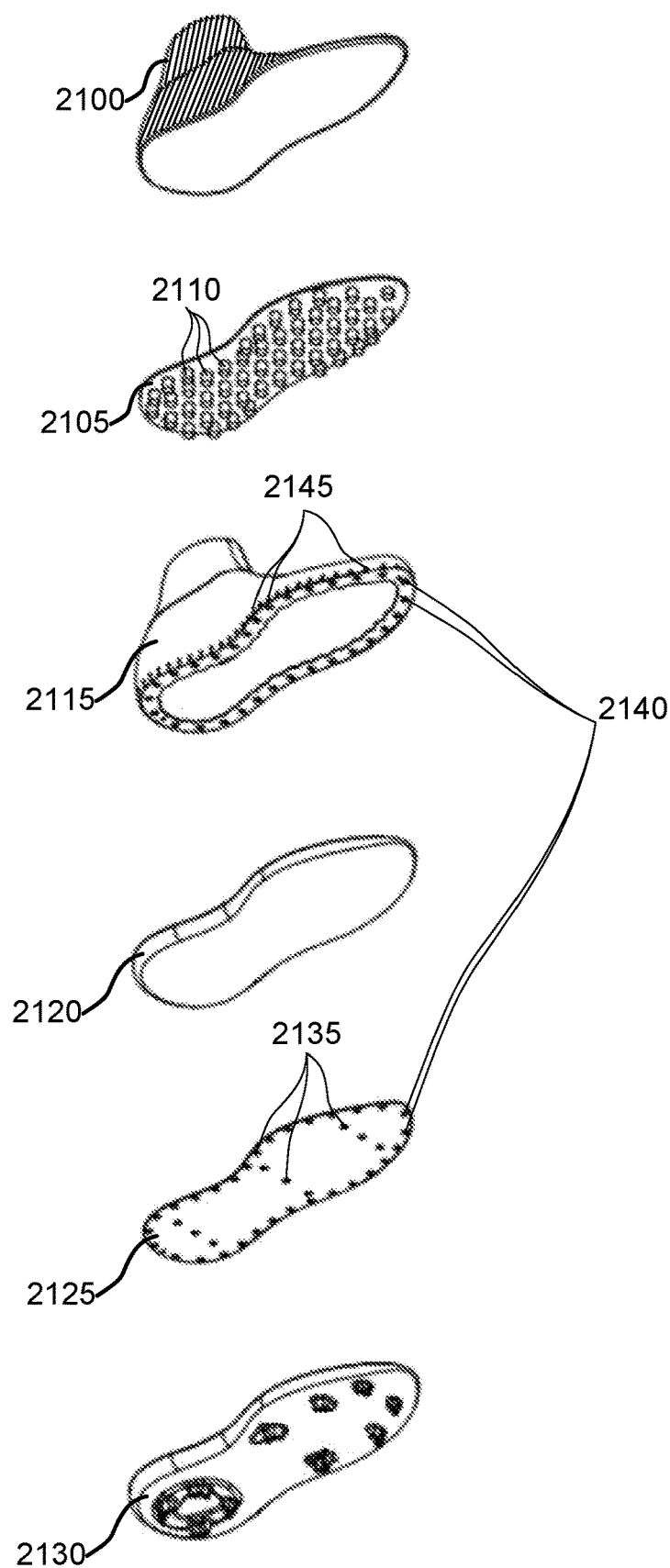
FIG. 21 shows an example of an exploded view of a shoe according to aspects of the present disclosure.

FIG. 21 shows an example of an exploded view of a shoe according to aspects of the present disclosure. The example shown includes last 2100, insole 2105, upper material 2115, molded material 2120, strobel board 2125, outsole 2130, strobel board perforations 2135, overlapping perforations 2140, and side perforations 2145. According to one or more aspects described herein, FIG. 21 may illustrate an example exploded view of a shoe (e.g., where a strobel board 2125 and insole 2105 have overlapping perforations 2140). In some examples, overlapping perforations 2140 may include or refer to underfoot upper perforations (e.g., perforations on an under side of upper material 2115) that overlap with strobel board perforations.

Last 2100 is an example of, or includes aspects of, the corresponding element described with reference to FIGS. 1, 11-14, 19, 20, and 27-32. Insole 2105 is an example of, or includes aspects of, the corresponding element described with reference to FIGS. 1, 6, 7, 11-20, and 27-34. In one embodiment, insole 2105 includes spacing structure 2110. Spacing structure 2110 is an example of, or includes aspects of, the corresponding element described with reference to FIGS. 1, 6, 7, 15-20, 33, and 34. Upper material 2115 is an example of, or includes aspects of, the corresponding element described with reference to FIGS. 1-5, 10-20, and 22-34. Molded material 2120 is an example of, or includes aspects of, the corresponding element described with reference to FIGS. 1, 15-20, 33, and 34. Strobel board 2125 is an example of, or includes aspects of, the corresponding element described with reference to FIGS. 1, 8-14, 19, 20, and 26-32.

Outsole 2130 is an example of, or includes aspects of, the corresponding element described with reference to FIG. 1. Strobel board perforations 2135 is an example of, or includes aspects of, the corresponding element described with reference to FIGS. 26-34. Overlapping perforations 2140 is an example of, or includes aspects of, the corresponding element described with reference to FIGS. 22-34. Side perforations 2145 is an example of, or includes aspects of, the corresponding element described with reference to FIGS. 1-5, 10-20, and 22-34.

Figure 22:
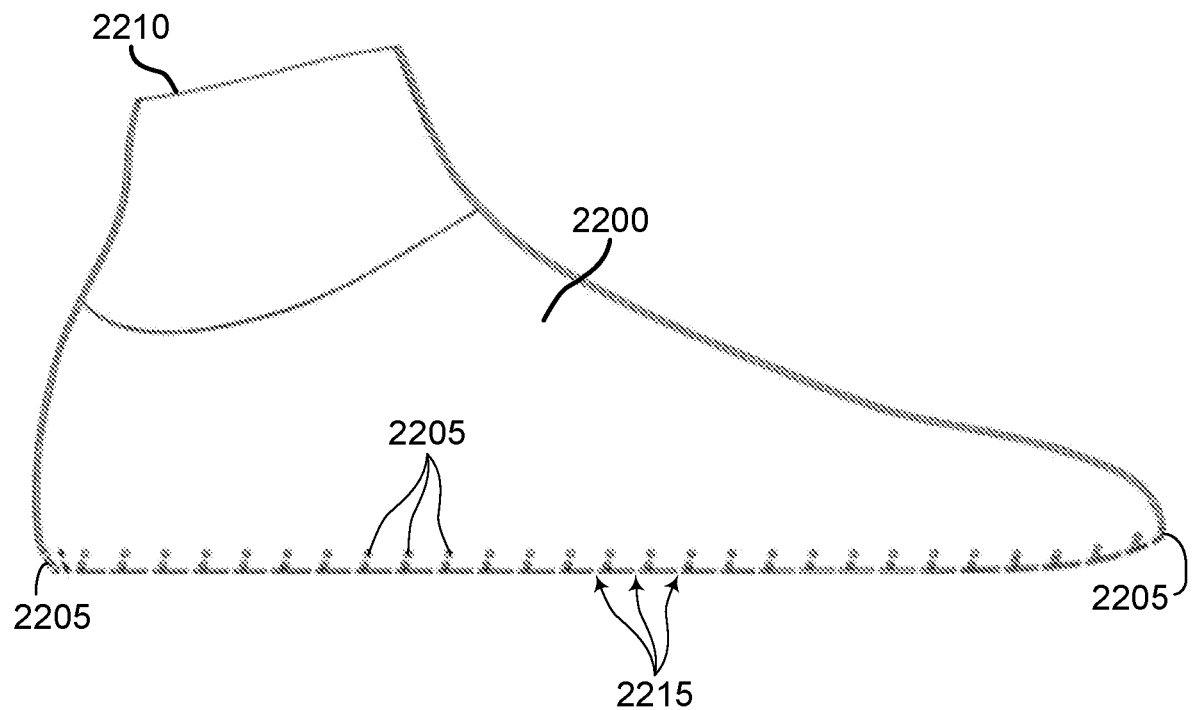
FIG. 22 shows an example of a side cross section of a shoe upper according to aspects of the present disclosure.

FIG. 22 shows an example of a side cross section of a shoe upper according to aspects of the present disclosure. The example shown includes upper material 2200, side perforations 2205, collar 2210, and overlapping perforations 2215. According to one or more aspects described herein, FIG. 22 may illustrate an example side cross section of shoe upper with overlapping perforations 2215 (e.g., perforations overlapping with perforations of a strobel board, not shown).

Upper material 2200 is an example of, or includes aspects of, the corresponding element described with reference to FIGS. 1-5, 10-21, and 23-34. Side perforations 2205 is an example of, or includes aspects of, the corresponding element described with reference to FIGS. 1-5, 10-21, and 23-34. Collar 2210 is an example of, or includes aspects of, the corresponding element described with reference to FIGS. 1-5, 11-14, 24, 25, and 27-32. Overlapping perforations 2215 is an example of, or includes aspects of, the corresponding element described with reference to FIGS. 21, and 23-34.

Figure 23:
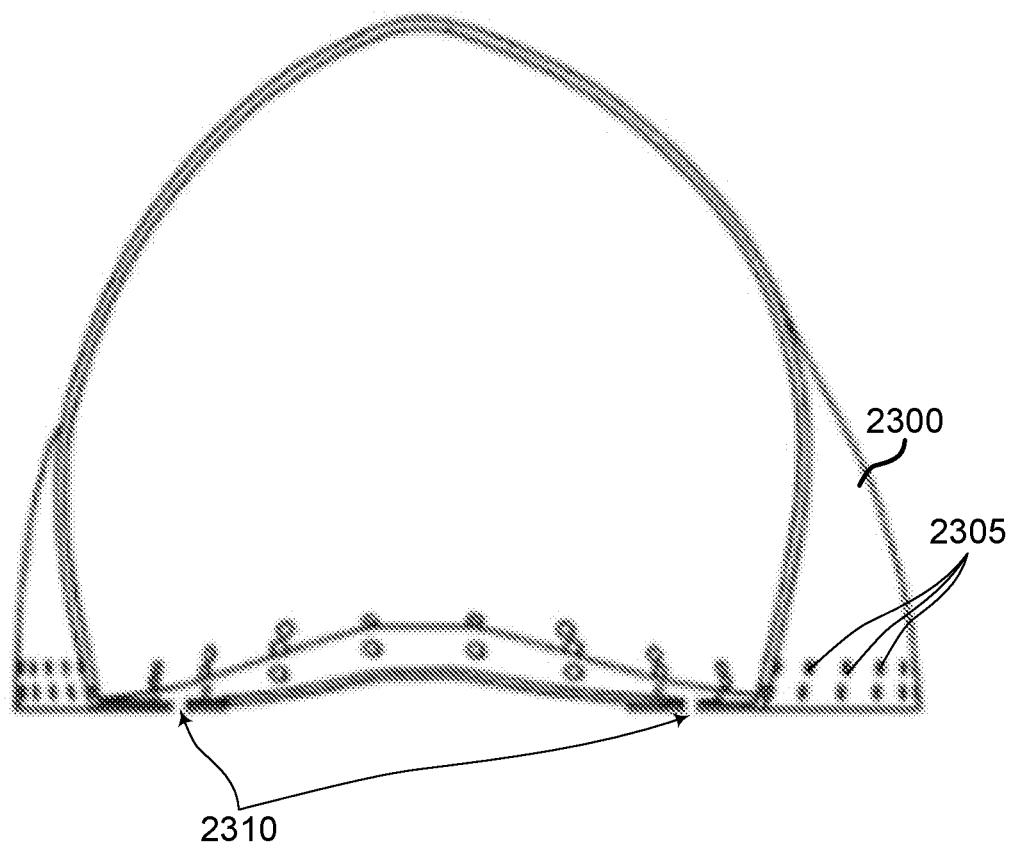
FIG. 23 shows an example of a front cross section of a shoe upper according to aspects of the present disclosure.

FIG. 23 shows an example of a front cross section of a shoe upper according to aspects of the present disclosure. The example shown includes upper material 2300, side perforations 2305, and overlapping perforations 2310. According to one or more aspects described herein, FIG. 23 may illustrate an example front cross section of shoe upper with overlapping perforations 2310.

Upper material 2300 is an example of, or includes aspects of, the corresponding element described with reference to FIGS. 1-5, 10-22, and 24-34. Side perforations 2305 is an example of, or includes aspects of, the corresponding element described with reference to FIGS. 1-5, 10-22, and 24-34. Overlapping perforations 2310 is an example of, or includes aspects of, the corresponding element described with reference to FIGS. 21, 22, and 24-34.

Figure 24:
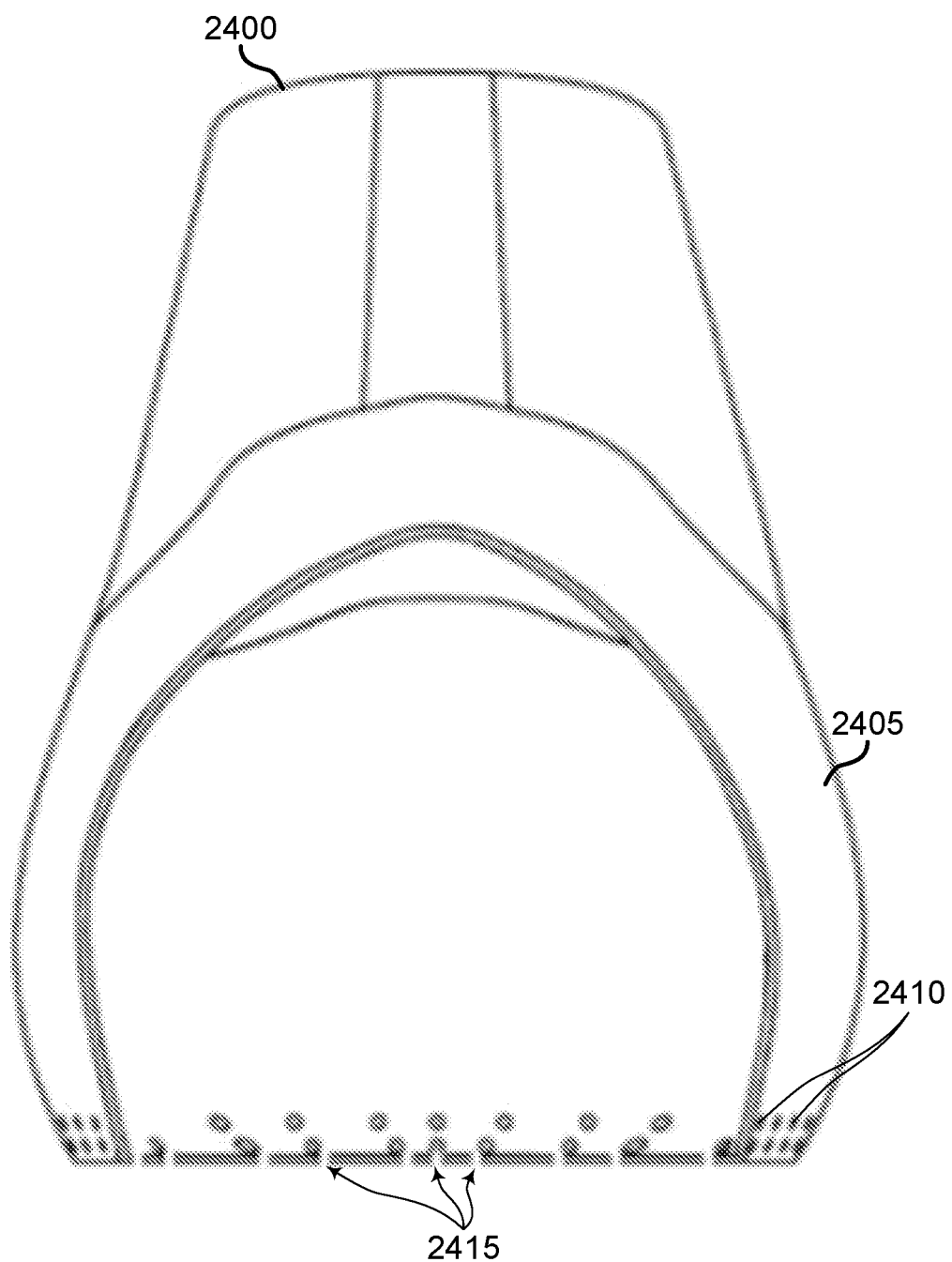
FIG. 24 shows an example of a rear cross section of a shoe upper according to aspects of the present disclosure.

FIG. 24 shows an example of a rear cross section of a shoe upper according to aspects of the present disclosure. The example shown includes collar 2400, upper material 2405, side perforations 2410, and overlapping perforations 2415. According to one or more aspects described herein, FIG. 24 may illustrate an example rear cross section of shoe upper with overlapping perforations 2415.

Collar 2400 is an example of, or includes aspects of, the corresponding element described with reference to FIGS. 1-5, 11-14, 22, 25, and 27-32. Upper material 2405 is an example of, or includes aspects of, the corresponding element described with reference to FIGS. 1-5, 10-23, and 25-34. Side perforations 2410 is an example of, or includes aspects of, the corresponding element described with reference to FIGS. 1-5, 10-23, and 25-34. Overlapping perforations 2415 is an example of, or includes aspects of, the corresponding element described with reference to FIGS. 21-23, and 25-34.

Figure 25:
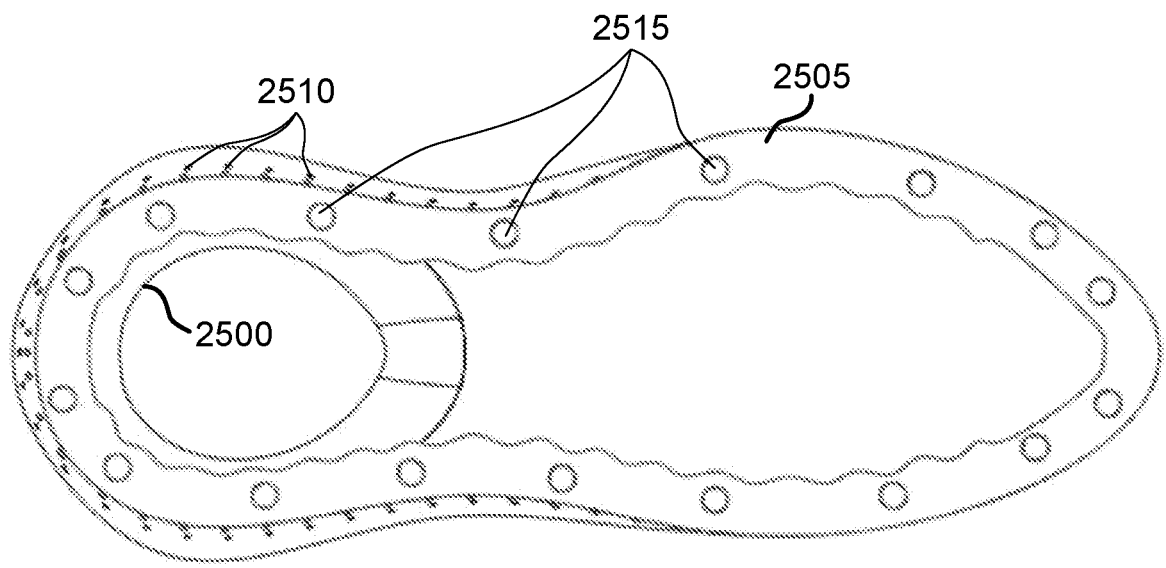
FIG. 25 shows an example of a bottom view of a shoe upper according to aspects of the present disclosure.

FIG. 25 shows an example of a bottom view of a shoe upper according to aspects of the present disclosure. The example shown includes collar 2500, upper material 2505, side perforations 2510, and overlapping perforations 2515. According to one or more aspects described herein, FIG. 25 may illustrate an example bottom view of a shoe upper with overlapping perforations 2515.

Collar 2500 is an example of, or includes aspects of, the corresponding element described with reference to FIGS. 1-5, 11-14, 22, 24, and 27-32. Upper material 2505 is an example of, or includes aspects of, the corresponding element described with reference to FIGS. 1-5, 10-24, and 26-34. Side perforations 2510 is an example of, or includes aspects of, the corresponding element described with reference to FIGS. 1-5, 10-24, and 26-34. Overlapping perforations 2515 is an example of, or includes aspects of, the corresponding element described with reference to FIGS. 21-24, and 26-34.

Figure 26:
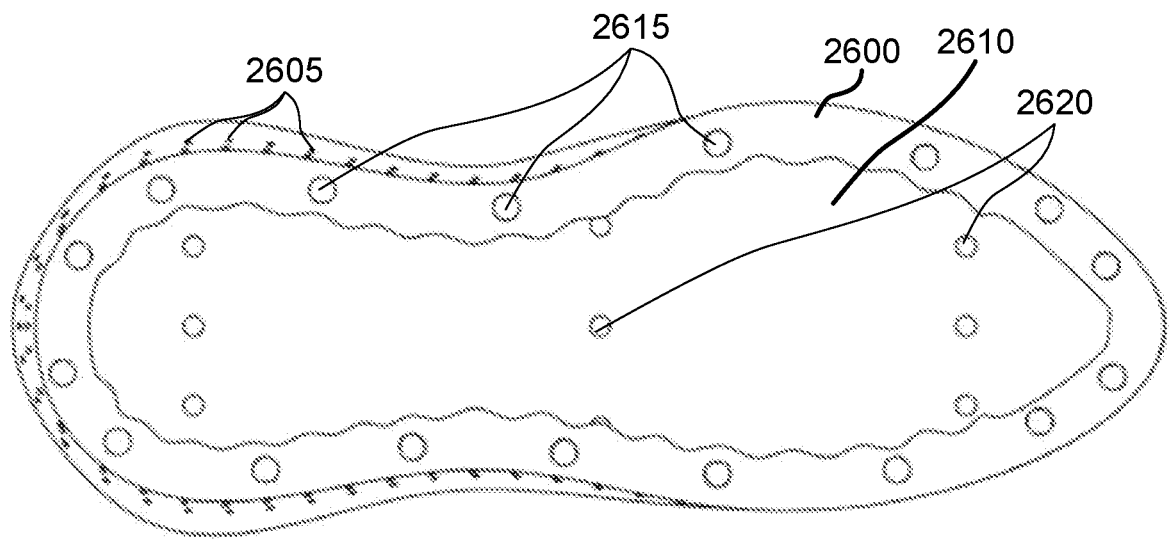
FIG. 26 shows an example of a bottom view of a lasted shoe upper according to aspects of the present disclosure.

FIG. 26 shows an example of a bottom view of a lasted shoe upper according to aspects of the present disclosure. The example shown includes upper material 2600, side perforations 2605, strobel board 2610, overlapping perforations 2615, and strobel board perforations 2620. According to one or more aspects described herein, FIG. 26 may illustrate an example bottom view of a lasted shoe upper. FIG. 26 may illustrate strobel board perforations 2620 in strobel board 2610. Overlapping perforations 2615 may include or refer to perforations that overlap (e.g., or go through both of) strobel board 2610 and upper material 2600 (e.g., perforations on an under side of upper material 2600 under the strobel board 2610 that align with strobel board perforations 2620).

Upper material 2600 is an example of, or includes aspects of, the corresponding element described with reference to FIGS. 1-5, 10-25, and 27-34. Side perforations 2605 is an example of, or includes aspects of, the corresponding element described with reference to FIGS. 1-5, 10-25, and 27-34. Strobel board 2610 is an example of, or includes aspects of, the corresponding element described with reference to FIGS. 1, 8-14, 19-21, and 27-32. Overlapping perforations 2615 is an example of, or includes aspects of, the corresponding element described with reference to FIGS. 21-25, and 27-34. Strobel board perforations 2620 is an example of, or includes aspects of, the corresponding element described with reference to FIGS. 21, and 27-34.

Figure 27:
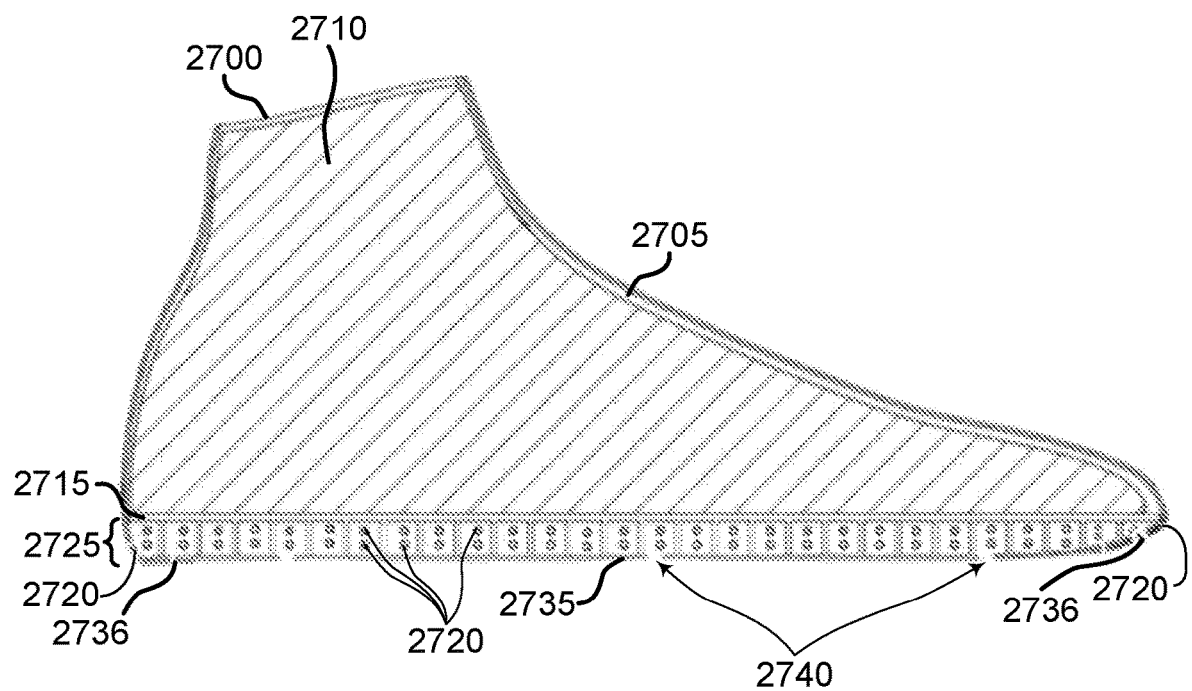
FIG. 27 shows an example of a side cross section of a lasted upper pre-molding according to aspects of the present disclosure.

FIG. 27 shows an example of a side cross section of a lasted upper pre-molding according to aspects of the present disclosure. The example shown includes collar 2700, upper material 2705, last 2710, insole 2715, side perforations 2720, internal cavity 2725, strobel board 2735, overlapping perforations 2736 and strobel board perforations 2740. According to one or more aspects described herein, FIG. 27 may illustrate an example side cross section of a lasted upper pre-molding. Overlapping perforations 2736 may include or refer to perforations that overlap (e.g., or go through both of) strobel board 2735 and upper material 2705 (e.g., perforations on an under side of upper material 2705 under the strobel board 2735 that align with strobel board perforations 2740).

Collar 2700 is an example of, or includes aspects of, the corresponding element described with reference to FIGS. 1-5, 11-14, 22, 24, 25, and 28-32. Upper material 2705 is an example of, or includes aspects of, the corresponding element described with reference to FIGS. 1-5, 10-26, and 28-34. Last 2710 is an example of, or includes aspects of, the corresponding element described with reference to FIGS. 1, 11-14, 19-21, and 28-32. Insole 2715 is an example of, or includes aspects of, the corresponding element described with reference to FIGS. 1, 6, 7, 11-21, and 28-34.

Side perforations 2720 is an example of, or includes aspects of, the corresponding element described with reference to FIGS. 1-5, 10-26, and 28-34. Internal cavity 2725 is an example of, or includes aspects of, the corresponding element described with reference to FIGS. 11-18, 28, and 31-34. Strobel board 2735 is an example of, or includes aspects of, the corresponding element described with reference to FIGS. 1, 8-14, 19-21, 26, and 28-32. Strobel board perforations 2740 is an example of, or includes aspects of, the corresponding element described with reference to FIGS. 21, 26, and 28-34.

Figure 28:
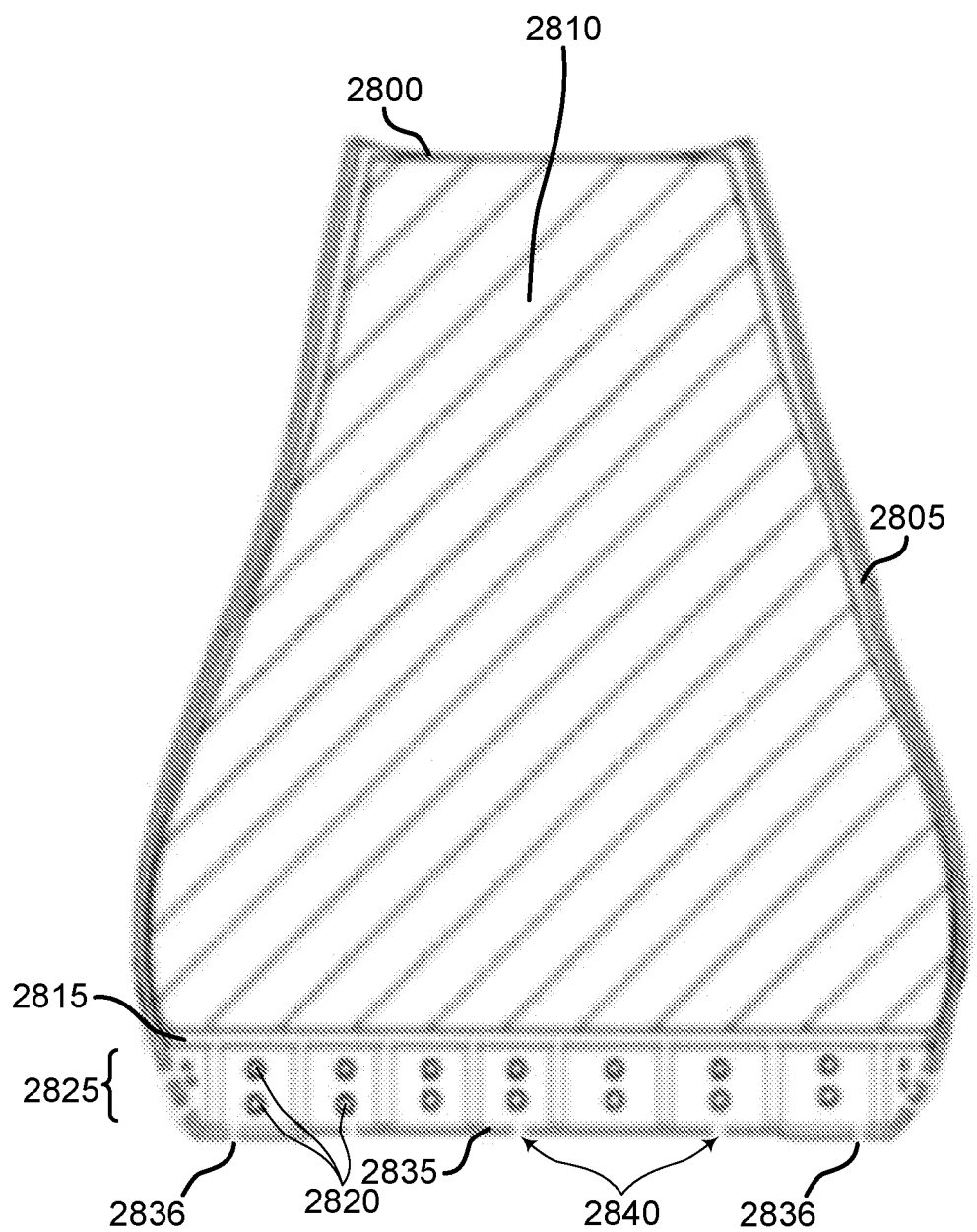
FIG. 28 shows an example of a rear cross section of a lasted upper pre-molding according to aspects of the present disclosure.

FIG. 28 shows an example of a rear cross section of a lasted upper pre-molding according to aspects of the present disclosure. The example shown includes collar 2800, upper material 2805, last 2810, insole 2815, side perforations 2820, internal cavity 2825, strobel board 2835, overlapping perforations 2836 and strobel board perforations 2840. According to one or more aspects described herein, FIG. 28 may illustrate an example rear cross section of a lasted upper pre-molding. Overlapping perforations 2836 may include or refer to perforations that overlap (e.g., or go through both of) strobel board 2835 and upper material 2805 (e.g., perforations on an under side of upper material 2805 under the strobel board 2835 that align with strobel board perforations 2840).

Collar 2800 is an example of, or includes aspects of, the corresponding element described with reference to FIGS. 1-5, 11-14, 22, 24, 25, 27, and 29-32. Upper material 2805 is an example of, or includes aspects of, the corresponding element described with reference to FIGS. 1-5, 10-27, and 29-34. Last 2810 is an example of, or includes aspects of, the corresponding element described with reference to FIGS. 1, 11-14, 19-21, 27, and 29-32. Insole 2815 is an example of, or includes aspects of, the corresponding element described with reference to FIGS. 1, 6, 7, 11-21, 27, and 29-34. Side perforations 2820 is an example of, or includes aspects of, the corresponding element described with reference to FIGS. 1-5, 10-27, and 29-34. Internal cavity 2825 is an example of, or includes aspects of, the corresponding element described with reference to FIGS. 11-18, 27, and 31-34. Strobel board 2835 is an example of, or includes aspects of, the corresponding element described with reference to FIGS. 1, 8-14, 19-21, 26, 27, and 29-32. Strobel board perforations 2840 is an example of, or includes aspects of, the corresponding element described with reference to FIGS. 21, 26, 27, and 29-34.

Figure 29:
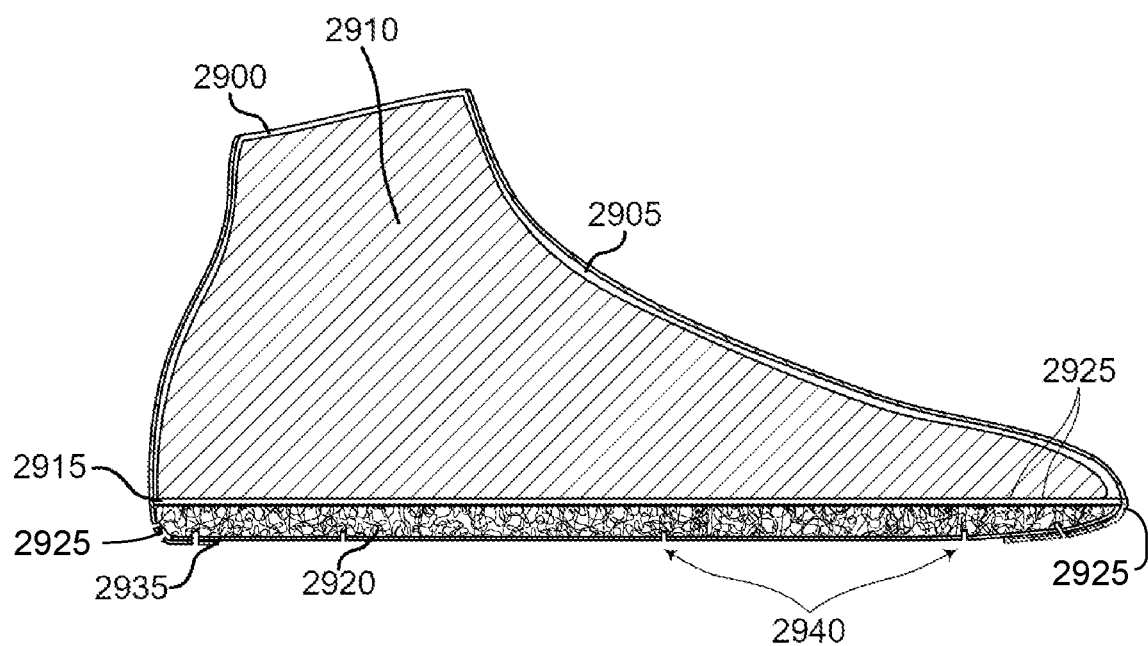
FIG. 29 shows an example of a side cross section of a lasted shoe upper with porous material according to aspects of the present disclosure.

FIG. 29 shows an example of a side cross section of a lasted shoe upper with porous material according to aspects of the present disclosure. The example shown includes collar 2900, upper material 2905, last 2910, insole 2915, porous material spacing feature 2920, side perforations 2925, strobel board 2935, and strobel board perforations 2940. According to one or more aspects described herein, FIG. 29 may illustrate an example side cross section of a lasted shoe upper with porous material. In one variation, overlapping perforations, such as shown in FIG. 27 (see, for example, overlapping performations 2736), may be employed in the embodiment of FIG. 29.

Collar 2900 is an example of, or includes aspects of, the corresponding element described with reference to FIGS. 1-5, 11-14, 22, 24, 25, 27, 28, and 30-32. Upper material 2905 is an example of, or includes aspects of, the corresponding element described with reference to FIGS. 1-5, 10-28, and 30-34. Last 2910 is an example of, or includes aspects of, the corresponding element described with reference to FIGS. 1, 11-14, 19-21, 27, 28, and 30-32. Insole 2915 is an example of, or includes aspects of, the corresponding element described with reference to FIGS. 1, 6, 7, 11-21, 27, 28, and 30-34.

Porous material spacing feature 2920 is an example of, or includes aspects of, the corresponding element described with reference to FIG. 30. Side perforations 2925 is an example of, or includes aspects of, the corresponding element described with reference to FIGS. 1-5, 10-28, and 30-34. Strobel board 2935 is an example of, or includes aspects of, the corresponding element described with reference to FIGS. 1, 8-14, 19-21, 26-28, and 30-32. Strobel board perforations 2940 is an example of, or includes aspects of, the corresponding element described with reference to FIGS. 21, 26-28, and 30-34.

Figure 30:
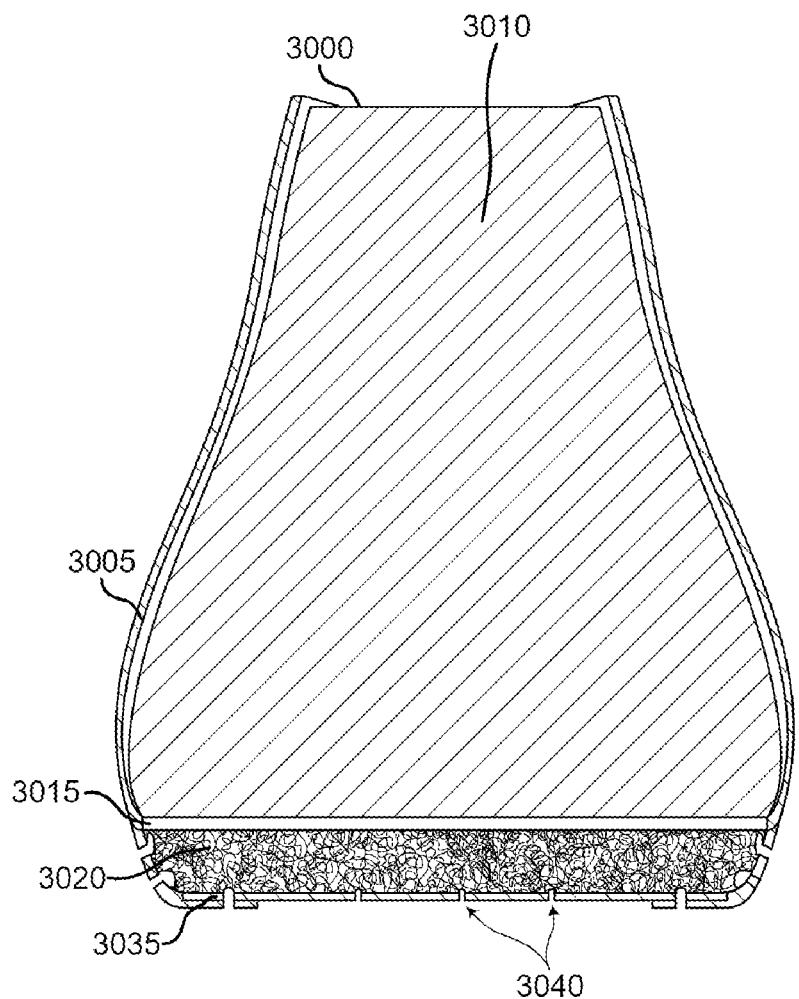
FIG. 30 shows an example of a rear cross section of a lasted shoe upper with porous material according to aspects of the present disclosure.

FIG. 30 shows an example of a rear cross section of a lasted shoe upper with porous material according to aspects of the present disclosure. The example shown includes collar 3000, upper material 3005, last 3010, insole 3015, porous material spacing feature 3020, strobel board 3035, and strobel board perforations 3040. According to one or more aspects described herein, FIG. 30 may illustrate an example rear cross section lasted shoe upper with porous material. In one variation, overlapping perforations, such as shown in FIGS. 27 and 28 (see, for example, overlapping performations 2736, 2828), may be employed in the embodiment of FIG. 30.

Collar 3000 is an example of, or includes aspects of, the corresponding element described with reference to FIGS. 1-5, 11-14, 22, 24, 25, 27-29, 31, and 32. Upper material 3005 is an example of, or includes aspects of, the corresponding element described with reference to FIGS. 1-5, 10-29, and 31-34. Last 3010 is an example of, or includes aspects of, the corresponding element described with reference to FIGS. 1, 11-14, 19-21, 27-29, 31, and 32. Insole 3015 is an example of, or includes aspects of, the corresponding element described with reference to FIGS. 1, 6, 7, 11-21, 27-29, and 31-34. Porous material spacing feature 3020 is an example of, or includes aspects of, the corresponding element described with reference to FIG. 29. Strobel board 3035 is an example of, or includes aspects of, the corresponding element described with reference to FIGS. 1, 8-14, 19-21, 26-29, 31, and 32. Strobel board perforations 3040 is an example of, or includes aspects of, the corresponding element described with reference to FIGS. 21, 26-29, and 31-34.

Figure 31:
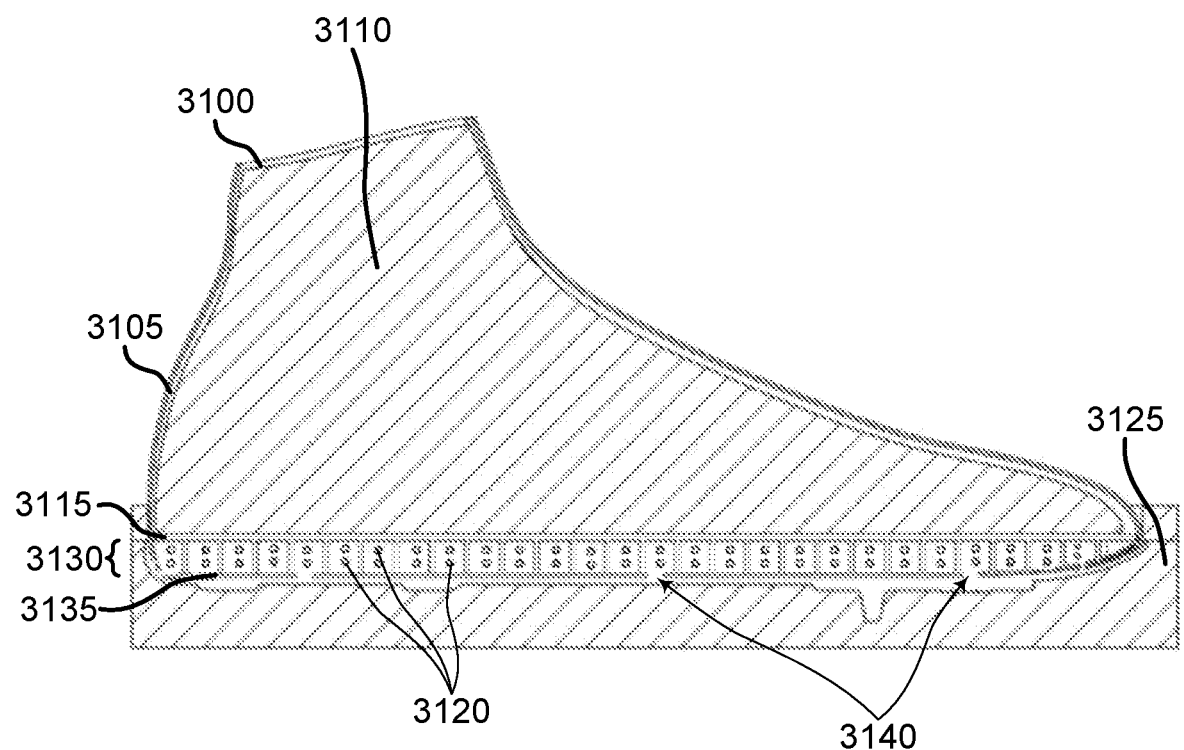
FIG. 31 shows an example of a side cross section of a lasted upper in mold pre-molding according to aspects of the present disclosure.

FIG. 31 shows an example of a side cross section of a lasted upper in mold 3125 pre-molding according to aspects of the present disclosure. The example shown includes collar 3100, upper material 3105, last 3110, insole 3115, side perforations 3120, mold 3125, internal cavity 3130, strobel board 3135, and strobel board perforations 3140. According to one or more aspects described herein, FIG. 31 may illustrate an example side cross section of lasted upper in mold pre-molding.

Collar 3100 is an example of, or includes aspects of, the corresponding element described with reference to FIGS. 1-5, 11-14, 22, 24, 25, 27-30, and 32. Upper material 3105 is an example of, or includes aspects of, the corresponding element described with reference to FIGS. 1-5, 10-30, and 32-34. Last 3110 is an example of, or includes aspects of, the corresponding element described with reference to FIGS. 1, 11-14, 19-21, 27-30, and 32. Insole 3115 is an example of, or includes aspects of, the corresponding element described with reference to FIGS. 1, 6, 7, 11-21, 27-30, and 32-34. Side perforations 3120 is an example of, or includes aspects of, the corresponding element described with reference to FIGS. 1-5, 10-30, and 32-34. Mold 3125 is an example of, or includes aspects of, the corresponding element described with reference to FIGS. 13, 14, 19, 20, and 32. Internal cavity 3130 is an example of, or includes aspects of, the corresponding element described with reference to FIGS. 11-18, 27, 28, and 32-34. Strobel board 3135 is an example of, or includes aspects of, the corresponding element described with reference to FIGS. 1, 8-14, 19-21, 26-30, and 32. Strobel board perforations 3140 is an example of, or includes aspects of, the corresponding element described with reference to FIGS. 21, 26-30, and 32-34.

Figure 32:
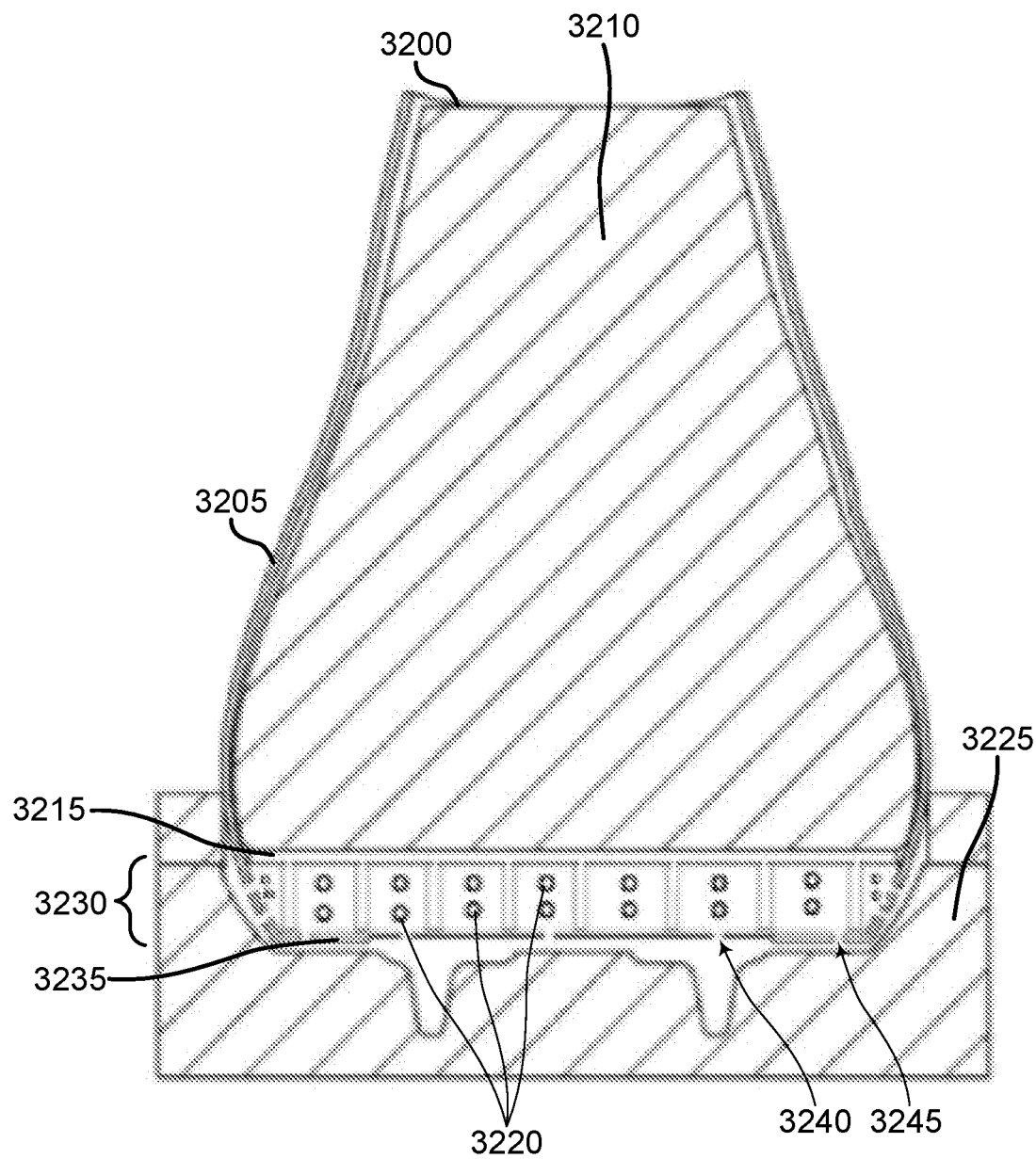
FIG. 32 shows an example of a rear cross section of a lasted upper in mold pre-molding according to aspects of the present disclosure.

FIG. 32 shows an example of a rear cross section of a lasted upper in mold 3225 pre-molding according to aspects of the present disclosure. The example shown includes collar 3200, upper material 3205, last 3210, insole 3215, side perforations 3220, mold 3225, internal cavity 3230, strobel board 3235, strobel board perforations 3240, and overlapping perforations 3245. According to one or more aspects described herein, FIG. 32 may illustrate an example rear cross section of lasted upper in mold pre-molding.

Collar 3200 is an example of, or includes aspects of, the corresponding element described with reference to FIGS. 1-5, 11-14, 22, 24, 25, and 27-31. Upper material 3205 is an example of, or includes aspects of, the corresponding element described with reference to FIGS. 1-5, 10-31, 33, and 34. Last 3210 is an example of, or includes aspects of, the corresponding element described with reference to FIGS. 1, 11-14, 19-21, and 27-31. Insole 3215 is an example of, or includes aspects of, the corresponding element described with reference to FIGS. 1, 6, 7, 11-21, 27-31, 33, and 34.

Side perforations 3220 is an example of, or includes aspects of, the corresponding element described with reference to FIGS. 1-5, 10-31, 33, and 34. Mold 3225 is an example of, or includes aspects of, the corresponding element described with reference to FIGS. 13, 14, 19, 20, and 31. Internal cavity 3230 is an example of, or includes aspects of, the corresponding element described with reference to FIGS. 11-18, 27, 28, 31, 33, and 34. Strobel board 3235 is an example of, or includes aspects of, the corresponding element described with reference to FIGS. 1, 8-14, 19-21, and 26-31. Strobel board perforations 3240 is an example of, or includes aspects of, the corresponding element described with reference to FIGS. 21, 26-31, 33, and 34. Overlapping perforations 3245 is an example of, or includes aspects of, the corresponding element described with reference to FIGS. 21-31, 33, and 34.

Figure 33:
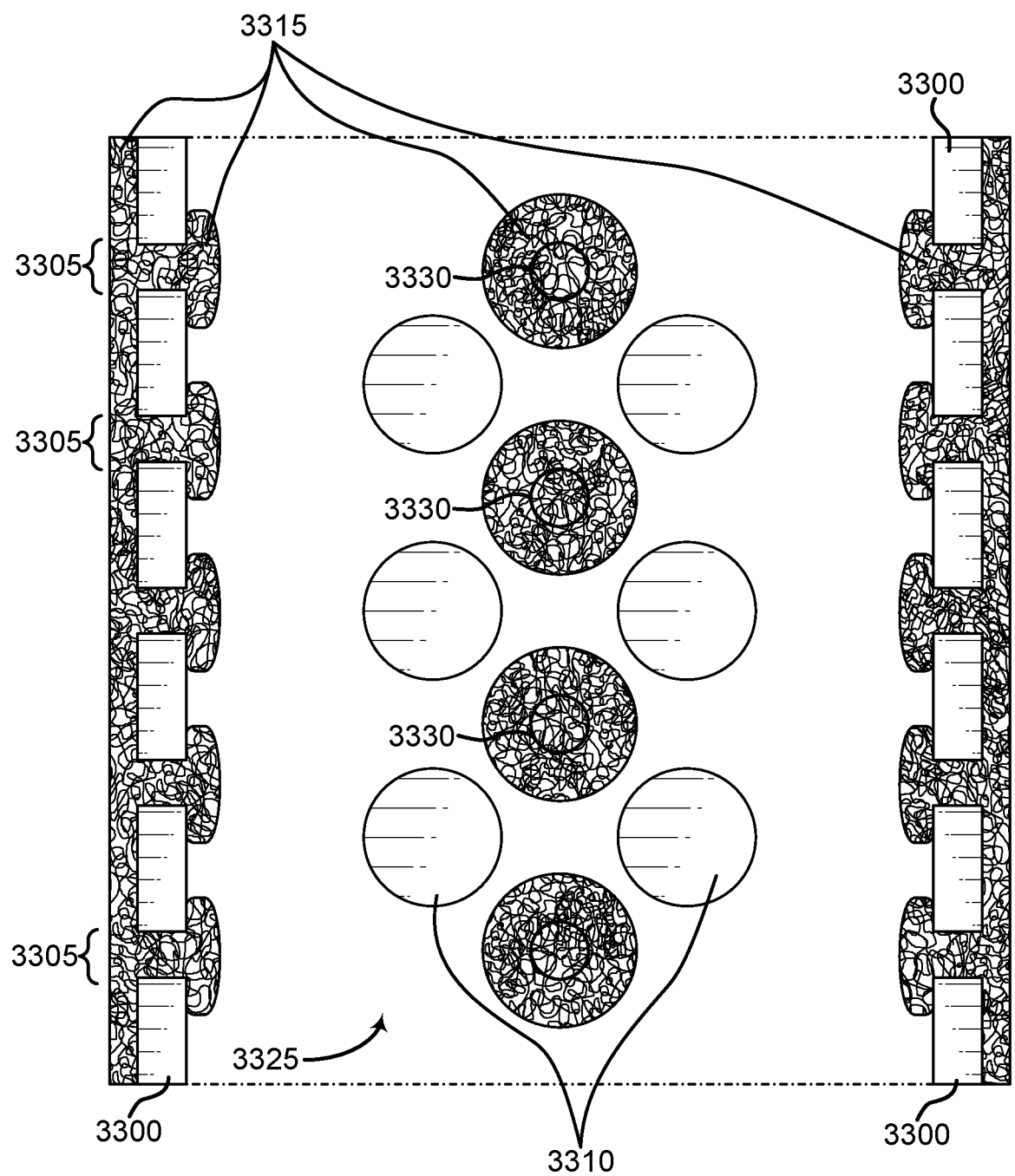
FIGS. 33 through 34 show examples of an injected material flow diagram according to aspects of the present disclosure.

FIG. 33 shows an example of an injected material flow diagram according to aspects of the present disclosure. The example shown includes upper material 3300, side perforations 3305, spacing structure 3310, molded material 3315, internal cavity 3325, and strobel board perforations 3330. According to one or more aspects described herein, FIG. 33 may illustrate an example of flowing injected material into internal cavity through side perforations and through strobel board perforations (e.g., through overlapping perforations), where material initially enters the internal cavity.

Upper material 3300 is an example of, or includes aspects of, the corresponding element described with reference to FIGS. 1-5, 10-32, and 34. Side perforations 3305 is an example of, or includes aspects of, the corresponding element described with reference to FIGS. 1-5, 10-32, and 34. Spacing structure 3310 is an example of, or includes aspects of, the corresponding element described with reference to FIGS. 1, 6, 7, 15-21, and 34. Molded material 3315 is an example of, or includes aspects of, the corresponding element described with reference to FIGS. 1, 15-21, and 34. Internal cavity 3325 is an example of, or includes aspects of, the corresponding element described with reference to FIGS. 11-18, 27, 28, 31, 32, and 34. Strobel board perforations 3330 is an example of, or includes aspects of, the corresponding element described with reference to FIGS. 21, 26-32, and 34.

Figure 34:
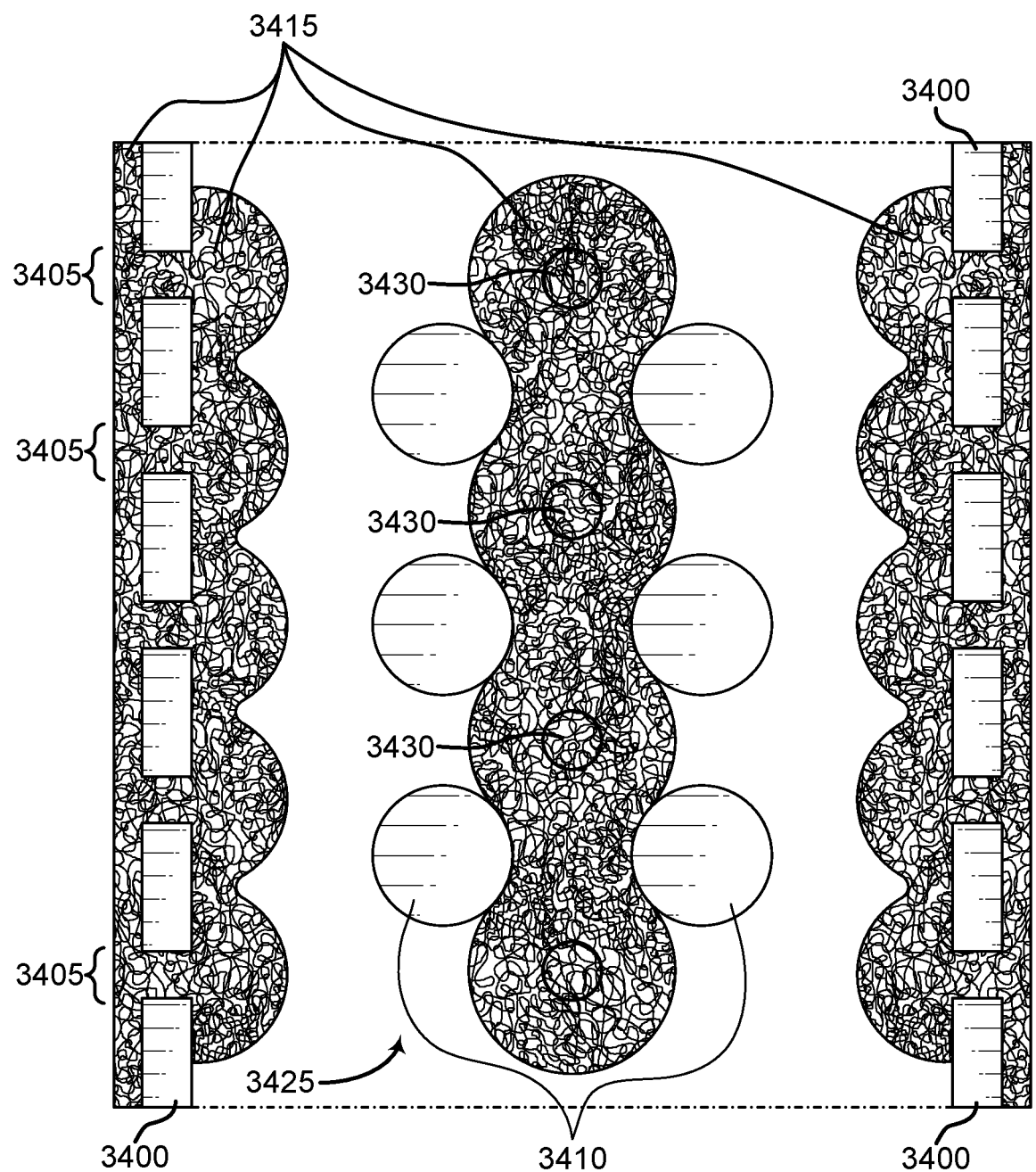

FIG. 34 shows an example of an injected material flow diagram according to aspects of the present disclosure. The example shown includes upper material 3400, side perforations 3405, spacing structure 3410, molded material 3415, internal cavity 3425, and strobel board perforations 3430. According to one or more aspects described herein, FIG. 34 may illustrate an example of flowing injected material into internal cavity through side perforations and through strobel board perforations (e.g., through overlapping perforations), where material fills the internal cavity and rejoins other material in the cavity filled through other perforations.

Upper material 3400 is an example of, or includes aspects of, the corresponding element described with reference to FIGS. 1-5, and 10-33. Side perforations 3405 is an example of, or includes aspects of, the corresponding element described with reference to FIGS. 1-5, and 10-33. Spacing structure 3410 is an example of, or includes aspects of, the corresponding element described with reference to FIGS. 1, 6, 7, 15-21, and 33. Molded material 3415 is an example of, or includes aspects of, the corresponding element described with reference to FIGS. 1, 15-21, and 33. Internal cavity 3425 is an example of, or includes aspects of, the corresponding element described with reference to FIGS. 11-18, 27, 28, and 31-33. Strobel board perforations 3430 is an example of, or includes aspects of, the corresponding element described with reference to FIGS. 21, and 26-33.

Figure 35:
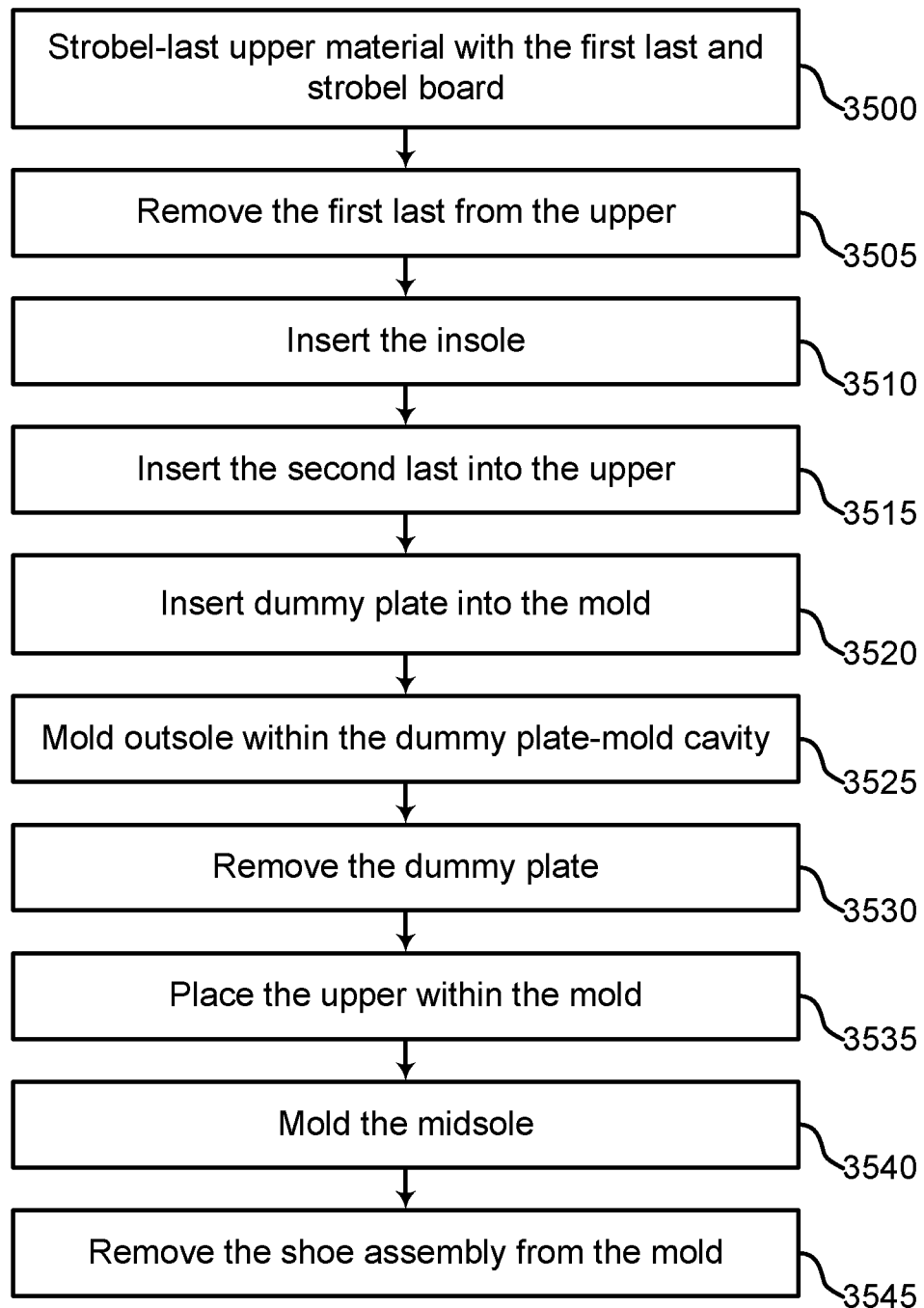
FIG. 35 shows an example of a process for manufacturing injection molded footwear according to aspects of the present disclosure.

FIG. 35 shows an example of a process for manufacturing injection molded footwear according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 3500, the system strobel-lasts upper material with the first last and strobel board. In some cases, the operations of this step refer to, or may be performed by, a shoe manufacturing apparatus as described with reference to FIG. 36.

At operation 3505, the system removes the first last from the upper. In some cases, the operations of this step refer to, or may be performed by, a shoe manufacturing apparatus as described with reference to FIG. 36.

At operation 3510, the system inserts the insole. In some cases, the operations of this step refer to, or may be performed by, a shoe manufacturing apparatus as described with reference to FIG. 36.

At operation 3515, the system inserts the second last into the upper. In some cases, the operations of this step refer to, or may be performed by, a shoe manufacturing apparatus as described with reference to FIG. 36.

At operation 3520, the system inserts dummy plate into the mold (e.g., which may be optional depending on whether a one shot process or a two shot process is implemented). In some cases, the operations of this step refer to, or may be performed by, a shoe manufacturing apparatus as described with reference to FIG. 36.

At operation 3525, the system molds outsole within the dummy plate-mold cavity. In some cases, the operations of this step refer to, or may be performed by, a shoe manufacturing apparatus as described with reference to FIG. 36.

At operation 3530, the system removes the dummy plate. In some cases, the operations of this step refer to, or may be performed by, a shoe manufacturing apparatus as described with reference to FIG. 36.

At operation 3535, the system places the upper within the mold. In some cases, the operations of this step refer to, or may be performed by, a shoe manufacturing apparatus as described with reference to FIG. 36.

At operation 3540, the system molds the midsole. In some cases, the operations of this step refer to, or may be performed by, a shoe manufacturing apparatus as described with reference to FIG. 36.

At operation 3545, the system removes the shoe assembly from the mold. In some cases, the operations of this step refer to, or may be performed by, a shoe manufacturing apparatus as described with reference to FIG. 36.

Figure 36:
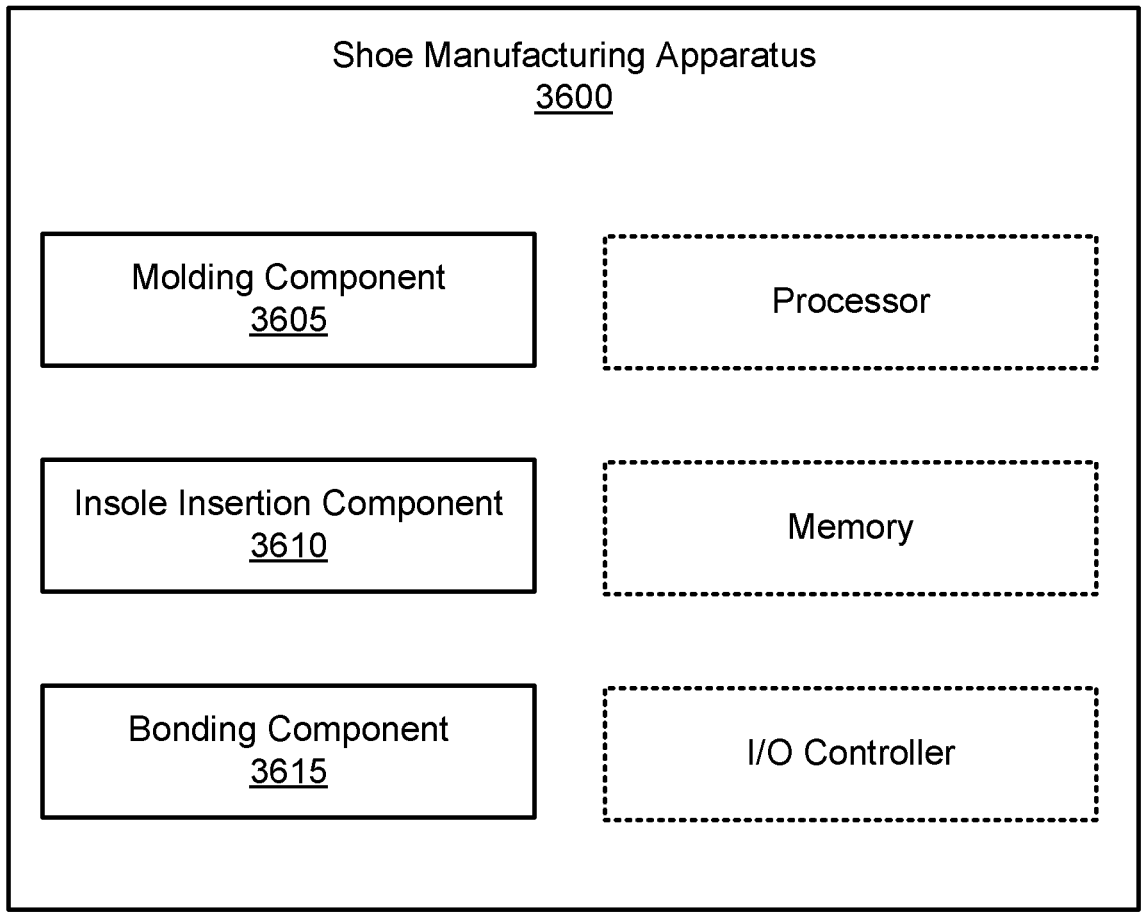
FIG. 36 shows an example of a shoe manufacturing system according to aspects of the present disclosure.

FIG. 36 shows an example of a shoe manufacturing system according to aspects of the present disclosure. The example shown includes shoe manufacturing apparatus 3600, molding component 3605, insole insertion component 3610, and bonding component 3615.

According to some embodiments, shoe manufacturing apparatus 3600 provides a shoe upper. In some examples, shoe manufacturing apparatus 3600 removes the molded footwear from the mold. In some examples, shoe manufacturing apparatus 3600 removes a last from the shoe upper.

According to some embodiments, molding component 3605 places the shoe upper into a mold. In some examples, molding component 3605 molds, externally to the shoe upper, an external portion of contiguous material bonded through the hole to the shoe upper. In some examples, molding component 3605 inserts a dummy plate into the mold to form a dummy-plate-mold cavity. In some examples, molding component 3605 inserts a last into the shoe upper. In some examples, molding component 3605 molds an outsole within the dummy-plate-mold cavity. In some examples, molding component 3605 removes the dummy plate from the mold to expose the outsole, where the shoe upper is placed into the mold in juxtaposition with the outsole.

According to some embodiments, insole insertion component 3610 inserts an insole into the shoe upper to form a cavity between the insole and the shoe upper via a spacing structure that maintains the insole in a spaced apart relationship from the shoe upper. In some examples, the spacing structure includes a spacing feature on the insole. In some examples, the spacing structure includes a porous material in the cavity, and the material is bonded to the porous material.

According to some embodiments, bonding component 3615 forms a bond within the cavity formed between the insole and the shoe upper by flowing material into a hole in the shoe upper positioned adjacent to the cavity. In some examples, the bond is formed within the cavity by flowing the material into a set of holes in the shoe upper positioned adjacent to the cavity. In some examples, bonding component 3615 forms the bond within the cavity by flowing the material into another hole in the shoe upper positioned adjacent to the cavity. In some examples, bonding component 3615 rejoins material in the cavity flowed into the hole with material in the cavity flowed into the other hole. In some examples, the hole has at least one opening dimension of from 0.01 millimeters to 250 millimeters. In some examples, the hole is circular and has a diameter of from 0.01 millimeters to 250 millimeters. In some examples, the hole has a first opening dimension of from 0.01 millimeters to 250 millimeters, and a second opening dimension of from 0.01 millimeters to 250 millimeters.

In some examples, the hole in the shoe upper is along a lower portion of a side edge of the shoe upper and above a peripheral edge of a strobel board. In some examples, the strobel board includes a strobel board hole in the strobel board, and the hole in the strobel board is oriented to face the cavity. In some examples, bonding component 3615 rejoins material in the cavity flowed into the hole with material in the cavity flowed into the strobel board hole. In some examples, the strobel board includes a set of strobel board holes in the strobel board, and the set of strobel board holes in the strobel board are oriented to face the cavity. In some examples, the shoe upper includes a set of additional holes in an overlapping portion of the shoe upper that each align at least partially with respective ones of the set of strobel board holes in the strobel board. In some examples, the shoe upper includes an additional hole in an overlapping portion of the shoe upper that aligns at least partially with the strobel board hole in the strobel board. In some examples, bonding component 3615 rejoins material in the cavity flowed into the hole with material in the cavity flowed into the overlapping portion.

In some examples, shoe manufacturing apparatus 3600 may include other components (e.g., such as a processor, memory, and I/O controller).

A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In some cases, the processor is configured to execute computer-readable instructions stored in a memory to perform various functions. In some embodiments, a processor includes special purpose components for modem processing, baseband processing, digital signal processing, or transmission processing.

Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

An input/output (I/O) controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an IO controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an I/O controller.

Figure 37:
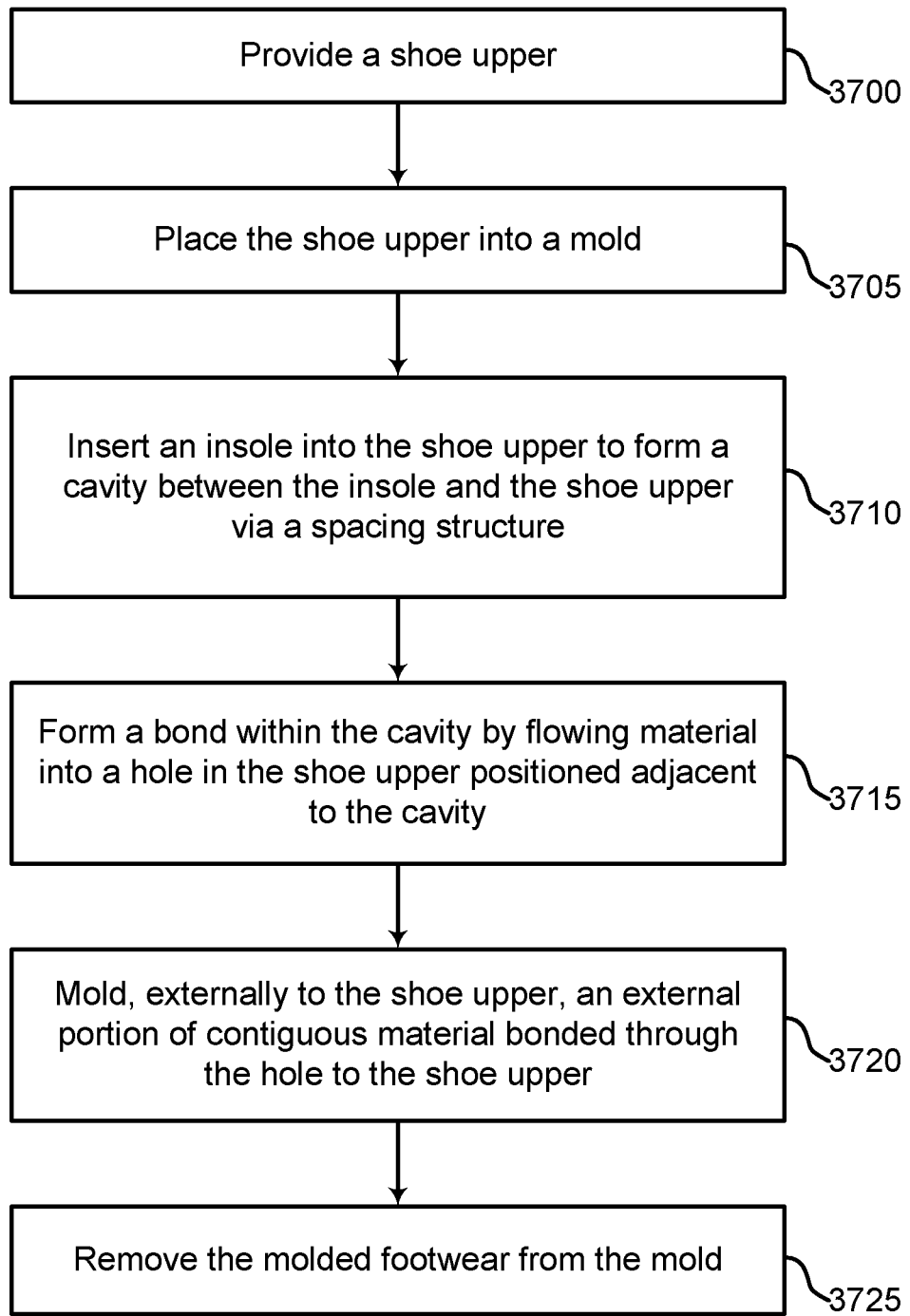
FIG. 37 shows an example of a process for molded footwear according to aspects of the present disclosure.

FIG. 37 shows an example of a process for molded footwear according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 3700, the system provides a shoe upper. In some cases, the operations of this step refer to, or may be performed by, a shoe manufacturing apparatus as described with reference to FIG. 36.

At operation 3705, the system places the shoe upper into a mold. In some cases, the operations of this step refer to, or may be performed by, a molding component as described with reference to FIG. 36.

At operation 3710, the system inserts an insole into the shoe upper to form a cavity between the insole and the shoe upper via a spacing structure that maintains the insole in a spaced apart relationship from the shoe upper. In some cases, the operations of this step refer to, or may be performed by, an insole insertion component as described with reference to FIG. 36.

At operation 3715, the system forms a bond within the cavity formed between the insole and the shoe upper by flowing material into a hole in the shoe upper positioned adjacent to the cavity. In some cases, the operations of this step refer to, or may be performed by, a bonding component as described with reference to FIG. 36.

At operation 3720, the system molds, externally to the shoe upper, an external portion of contiguous material bonded through the hole to the shoe upper. In some cases, the operations of this step refer to, or may be performed by, a molding component as described with reference to FIG. 36.

At operation 3725, the system removes the molded footwear from the mold. In some cases, the operations of this step refer to, or may be performed by, a shoe manufacturing apparatus as described with reference to FIG. 36.

Figure 38:
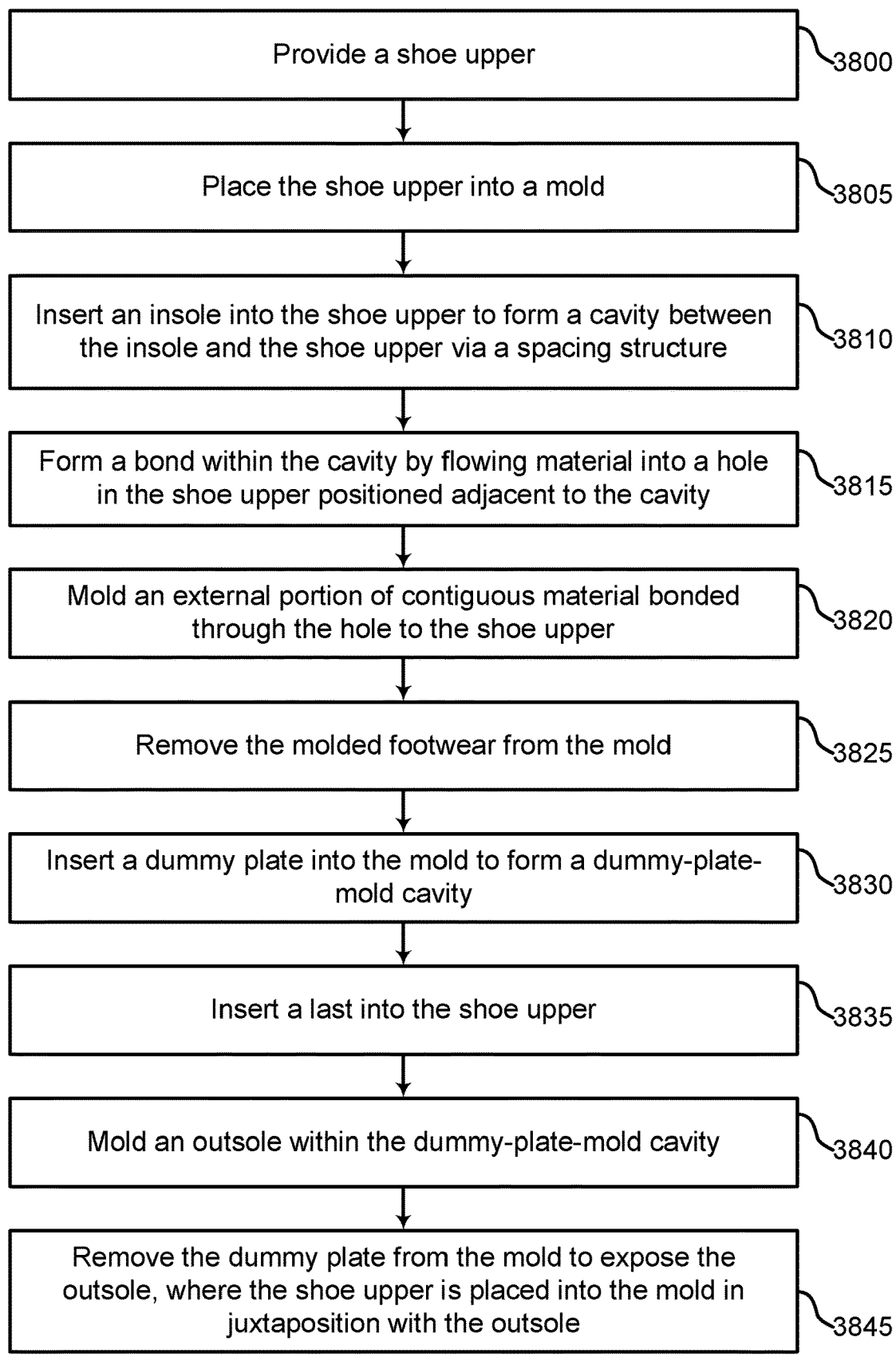
FIGS. 38 through 39 show examples of a process for manufacturing molded footwear according to aspects of the present disclosure.

FIG. 38 shows an example of a process for manufacturing molded footwear according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 3800, the system provides a shoe upper. In some cases, the operations of this step refer to, or may be performed by, a shoe manufacturing apparatus as described with reference to FIG. 36.

At operation 3805, the system places the shoe upper into a mold. In some cases, the operations of this step refer to, or may be performed by, a molding component as described with reference to FIG. 36.

At operation 3810, the system inserts an insole into the shoe upper to form a cavity between the insole and the shoe upper via a spacing structure that maintains the insole in a spaced apart relationship from the shoe upper. In some cases, the operations of this step refer to, or may be performed by, an insole insertion component as described with reference to FIG. 36.

At operation 3815, the system forms a bond within the cavity formed between the insole and the shoe upper by flowing material into a hole in the shoe upper positioned adjacent to the cavity. In some cases, the operations of this step refer to, or may be performed by, a bonding component as described with reference to FIG. 36.

At operation 3820, the system molds, externally to the shoe upper, an external portion of contiguous material bonded through the hole to the shoe upper. In some cases, the operations of this step refer to, or may be performed by, a molding component as described with reference to FIG. 36.

At operation 3825, the system removes the molded footwear from the mold. In some cases, the operations of this step refer to, or may be performed by, a shoe manufacturing apparatus as described with reference to FIG. 36.

At operation 3830, the system inserts a dummy plate into the mold to form a dummy-plate-mold cavity. In some cases, the operations of this step refer to, or may be performed by, a molding component as described with reference to FIG. 36.

At operation 3835, the system inserts a last into the shoe upper. In some cases, the operations of this step refer to, or may be performed by, a molding component as described with reference to FIG. 36.

At operation 3840, the system molds an outsole within the dummy-plate-mold cavity. In some cases, the operations of this step refer to, or may be performed by, a molding component as described with reference to FIG. 36.

At operation 3845, the system removes the dummy plate from the mold to expose the outsole, where the shoe upper is placed into the mold in juxtaposition with the outsole. In some cases, the operations of this step refer to, or may be performed by, a molding component as described with reference to FIG. 36.

Figure 39:
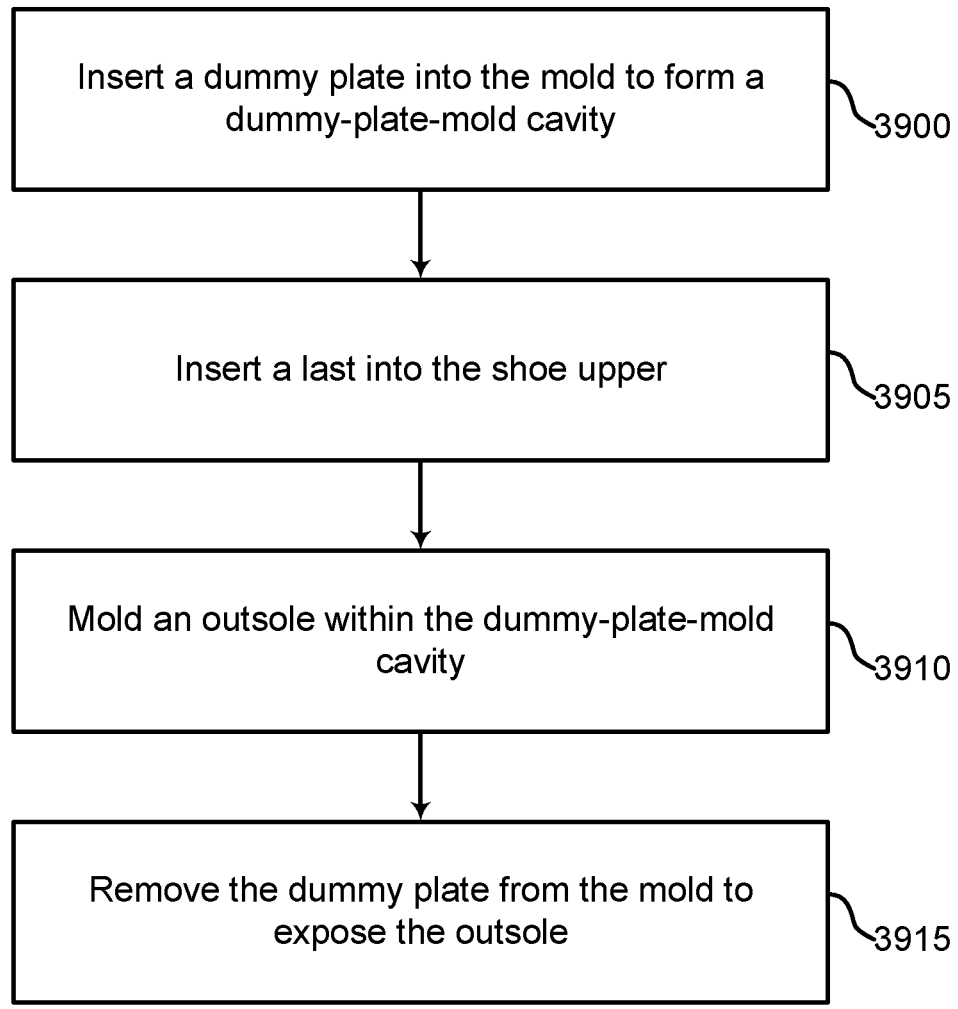

FIG. 39 shows an example of a process for manufacturing molded footwear according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 3900, the system inserts a dummy plate into the mold to form a dummy-plate-mold cavity. In some cases, the operations of this step refer to, or may be performed by, a molding component as described with reference to FIG. 36.

At operation 3905, the system inserts a last into the shoe upper. In some cases, the operations of this step refer to, or may be performed by, a molding component as described with reference to FIG. 36.

At operation 3910, the system molds an outsole within the dummy-plate-mold cavity. In some cases, the operations of this step refer to, or may be performed by, a molding component as described with reference to FIG. 36.

At operation 3915, the system removes the dummy plate from the mold to expose the outsole, where the shoe upper is placed into the mold in juxtaposition with the outsole. In some cases, the operations of this step refer to, or may be performed by, a molding component as described with reference to FIG. 36.

Accordingly, the present disclosure includes the following embodiments.

A method for molded footwear is described. One or more embodiments of the method include providing a shoe upper, placing the shoe upper into a mold, inserting an insole into the shoe upper to form a cavity between the insole and the shoe upper via a spacing structure that maintains the insole in a spaced apart relationship from the shoe upper, forming a bond within the cavity formed between the insole and the shoe upper by flowing material into a hole in the shoe upper positioned adjacent to the cavity, molding, externally to the shoe upper, an external portion of contiguous material bonded through the hole to the shoe upper, and removing the molded footwear from the mold.

In some examples, the bond is formed within the cavity by flowing the material into a plurality of holes in the shoe upper positioned adjacent to the cavity. Some examples of the method, apparatus, and system described above further include forming the bond within the cavity by flowing the material into another hole in the shoe upper positioned adjacent to the cavity. Some examples further include rejoining material in the cavity flowed into the hole with material in the cavity flowed into the other hole.

In some examples, the spacing structure comprises a spacing feature on the insole. In some examples, the spacing structure comprises a porous material in the cavity, and the material is bonded to the porous material. In some examples, the hole has at least one opening dimension of from 0.01 millimeters to 250 millimeters. In some examples, the hole is circular and has a diameter of from 0.01 millimeters to 250 millimeters. In some examples, the hole has a first opening dimension of from 0.01 millimeters to 250 millimeters, and a second opening dimension of from 0.01 millimeters to 250 millimeters.

In some examples, the hole in the shoe upper is along a lower portion of a side edge of the shoe upper and above a peripheral edge of a strobel board. In some examples, the strobel board comprises a strobel board hole in the strobel board, and the hole in the strobel board is oriented to face the cavity.

Some examples of the method, apparatus, and system described above further include rejoining material in the cavity flowed into the hole with material in the cavity flowed into the strobel board hole. In some examples, the strobel board comprises a plurality of strobel board holes in the strobel board, and the plurality of strobel board holes in the strobel board are oriented to face the cavity. In some examples, the shoe upper comprises a plurality of additional holes in an overlapping portion of the shoe upper that each align at least partially with respective ones of the plurality of strobel board holes in the strobel board.

In some examples, the shoe upper comprises an additional hole in an overlapping portion of the shoe upper that aligns at least partially with the strobel board hole in the strobel board. Some examples of the method, apparatus, and system described above further include rejoining material in the cavity flowed into the hole with material in the cavity flowed into the overlapping portion.

Some examples of the method, apparatus, and system described above further include inserting a dummy plate into the mold to form a dummy-plate-mold cavity. Some examples further include inserting a last into the shoe upper. Some examples further include molding an outsole within the dummy-plate-mold cavity. Some examples further include removing the dummy plate from the mold to expose the outsole, wherein the shoe upper is placed into the mold in juxtaposition with the outsole. Some examples of the method, apparatus, and system described above further include removing a last from the shoe upper.

An apparatus for molded footwear is described. One or more embodiments of the apparatus include a shoe upper comprising an interior and an exterior, wherein the interior defines a space having a bottom and sides surrounding the bottom, wherein a lower region of the sides comprise a hole, an insole comprising an upper surface and a lower surface, a spacing structure adjacent to the lower surface, wherein the insole is adjacent to and generally parallel with the bottom of the shoe upper, whereby the spacing structure maintains the insole in a spaced-apart relationship from the bottom, and to define a cavity between the insole, the bottom, and the lower region of the sides, and a molded material substantially filling the cavity, and covering a portion of the exterior adjacent to the lower region of the sides, wherein the molded material is contiguous through the hole.

A system for molded footwear is described. One or more embodiments of the system comprise: a shoe upper comprising an interior and an exterior, wherein the interior defines a space having a bottom and sides surrounding the bottom, wherein a lower region of the sides comprise a hole, an insole comprising an upper surface and a lower surface, a spacing structure adjacent to the lower surface, wherein the insole is adjacent to and generally parallel with the bottom of the shoe upper, whereby the spacing structure maintains the insole in a spaced-apart relationship from the bottom, and to define a cavity between the insole, the bottom, and the lower region of the sides, and a molded material substantially filling the cavity, and covering a portion of the exterior adjacent to the lower region of the sides, wherein the molded material is contiguous through the hole.

A method of manufacturing an apparatus for molded footwear is described. The method includes a shoe upper comprising an interior and an exterior, wherein the interior defines a space having a bottom and sides surrounding the bottom, wherein a lower region of the sides comprise a hole, an insole comprising an upper surface and a lower surface, a spacing structure adjacent to the lower surface, wherein the insole is adjacent to and generally parallel with the bottom of the shoe upper, whereby the spacing structure maintains the insole in a spaced-apart relationship from the bottom, and to define a cavity between the insole, the bottom, and the lower region of the sides, and a molded material substantially filling the cavity, and covering a portion of the exterior adjacent to the lower region of the sides, wherein the molded material is contiguous through the hole.

In some examples, the lower region comprises a plurality of holes. In some examples, the lower region of the sides comprises another hole. In some examples, the molded material is contiguous through the another hole and rejoined with the molded material contiguous through the hole.

In some examples, the spacing structure comprises a spacing feature on the lower surface. In some examples, the spacing structure comprises a porous material in the cavity, and the molded material is bonded to the porous material. In some examples, the molded material is bonded to the upper. In some examples, the bottom comprises a strobel board. In some examples, the strobel board comprises a perforation.

In some examples, the molded material is contiguous through the perforation and rejoined with material contiguous through the hole. In some examples, the molded material covers a portion of the exterior adjacent to the bottom, and the molded material is bonded through the perforation.

In some examples, the strobel board comprises a plurality of perforations. In some examples, the spacing structure rests against a top side of the strobel board to create the cavity between the insole and the strobel board. In some examples, the molded material comprises an injection molded material. In some examples, the molded material comprises a pour molded material. In some examples, the bottom comprises a strobel board, and the shoe upper overlaps at least an overlapping portion of the strobel board.

In some examples, the strobel board comprises a strobel board perforation and the overlapping portion comprises an overlapping portion perforation, where at least a portion of the overlapping portion perforation is aligned with at least a portion of the strobel board perforation. In some examples, the molded material covers a portion of the exterior adjacent to the bottom, and the molded material is bonded through the overlapping portion. Some examples of the apparatus, system, and method described above further include an outsole, where the outsole is coupled to the molded material.

While the invention herein disclosed has been described by means of specific embodiments, examples and applications thereof, numerous modifications and variations could be made thereto by those skilled in the art without departing from the scope of the invention set forth in the claims.

What is claimed is:

1. A molded footwear comprising: —a shoe upper configured to surround a foot, and having sides and a bottom connecting the sides, the shoe upper comprising an interior and an exterior, wherein the interior defines a space, wherein a lower region of the sides comprises at least one hole; —an insole located in the interior space above each of the at least one hole and comprising an upper surface and a lower surface, wherein the insole is above and generally parallel with the bottom of the shoe upper, wherein the insole abuts the interior of the shoe upper such that the sides of the shoe upper are continuous past the insole, whereby an internal cavity is entirely formed under the insole between the bottom, the lower region of the sides, and the insole; —a spacing structure adjacent to the lower surface, whereby the spacing structure maintains the insole in a spaced-apart relationship from the bottom of the shoe upper; and —a molded material substantially filling the cavity, and covering a portion of the lower region of the sides, wherein the molded material is contiguous through each of the at least one hole.

2. The molded footwear of claim 1, wherein the at least one hole is a plurality of holes.

3. The molded footwear of claim 1, wherein said lower region of said sides comprises another hole, wherein the molded material is contiguous through the other hole and rejoined with material contiguous through at least one of said at least one hole.

4. The molded footwear of claim 1, wherein said spacing structure comprises a spacing feature on the lower surface.

5. The molded footwear of claim 1, wherein said spacing structure comprises a porous material in said cavity, wherein said molded material is bonded to said porous material.

6. The molded footwear of claim 1, wherein said molded material is bonded to said upper.

7. The molded footwear of claim 1, wherein said bottom comprises a strobel board.

8. The molded footwear of claim 7, wherein said strobel board comprises a perforation.

9. The molded footwear of claim 8, wherein said molded material is contiguous through the perforation and rejoined with material contiguous through at least one of said at least one hole.

10. The molded footwear of claim 8, wherein the molded material covers a portion of the exterior adjacent to the bottom, wherein said molded material is bonded through said perforation.

11. The molded footwear of claim 7, wherein said strobel board comprises a plurality of perforations.

12. The molded footwear of claim 7, wherein said spacing structure rests against a top side of said strobel board to create said cavity between the insole and the strobel board.

13. The molded footwear of claim 1, wherein said molded material comprises an injection molded material.

14. The molded footwear of claim 1, wherein said molded material comprises a pour molded material.

15. The molded footwear of claim 1, wherein said bottom comprises a strobel board, wherein said shoe upper comprises an underfoot portion extending from the sides and overlapping at least an overlapping portion of the strobel board.

16. The molded footwear of claim 15, wherein said strobel board comprises a strobel board perforation, wherein said overlapping underfoot portion comprises an overlapping portion perforation, wherein at least a portion of the overlapping portion perforation is aligned with at least a portion of the strobel board perforation.

17. The molded footwear of claim 16, wherein the molded material covers a portion of the exterior adjacent to the bottom, wherein said molded material is bonded through said overlapping portion.

18. The molded footwear of claim 17 further comprising: an outsole, wherein said outsole is coupled to said molded material.

* * * * *